(12) United States Patent
Sells

(10) Patent No.: US 8,174,214 B2
(45) Date of Patent: May 8, 2012

(54) THREE-PHASE LOW-LOSS RECTIFIER WITH ACTIVE GATE DRIVE

(75) Inventor: Troy Woodrow Sells, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 368 days.

(21) Appl. No.: 12/567,847

(22) Filed: Sep. 28, 2009

(65) Prior Publication Data
US 2011/0075461 A1 Mar. 31, 2011

(51) Int. Cl.
H02P 7/00 (2006.01)
(52) U.S. Cl. ........................................ 318/268; 363/127
(58) Field of Classification Search .................... 363/17, 363/34, 35, 37, 46, 71, 81, 89, 125–127, 363/132; 318/504, 141, 143, 145, 246, 268; 307/46, 64, 66, 68, 67, 127; 361/77, 246
See application file for complete search history.

(56) References Cited

U.S. PATENT DOCUMENTS

| | | | |
|---|---|---|---|
| 4,139,880 A | 2/1979 | Ulmer et al. | |
| 4,423,456 A | 12/1983 | Zaidenweber | |
| 4,447,868 A | 5/1984 | Turnbull | |
| 4,449,176 A | 5/1984 | Turnbull | |
| 4,774,650 A | 9/1988 | Kahkipuro et al. | |
| 4,825,351 A | 4/1989 | Uesugi | |
| 5,268,833 A * | 12/1993 | Axer | 363/127 |
| 5,486,743 A * | 1/1996 | Nagai | 318/400.13 |
| 5,510,972 A | 4/1996 | Wong | |
| 5,623,550 A | 4/1997 | Killion | |
| 5,648,705 A | 7/1997 | Sitar et al. | |
| 5,793,167 A | 8/1998 | Liang et al. | |
| 5,808,882 A | 9/1998 | Mochikawa | |
| 5,870,031 A | 2/1999 | Kaiser et al. | |
| 5,991,182 A | 11/1999 | Novac et al. | |
| 6,147,545 A | 11/2000 | Marshall | |

(Continued)

FOREIGN PATENT DOCUMENTS

EP 1519476 3/2005
(Continued)

OTHER PUBLICATIONS

European Search Report mailed May 3, 2011, European Application No. 10015390.7-2207.

(Continued)

Primary Examiner — Rajnikant Patel
(74) Attorney, Agent, or Firm — Fox Rothschild, LLP; Robert J. Sacco

(57) ABSTRACT

A three-phase bridge rectifier circuit (BRC) connectable to an AC voltage source (ACVS) via input lines (151, 153, 155) and a load (109) via output lines (157, 159). ACVS (102, 104, 106) supplies BRC (100) with AC voltage waveforms that differ in phase. The BRC includes a three-phase bridge rectifier circuit comprised of field effect transistors (FET) and gate drive circuits (GDC). Each GDC (101a, 103a, 101b, 103b, 101c, 103c) supplies a voltage to a gate of a respective FET (110, 112, 114, 116, 118, 120) for switching the FET to its "on" state at a certain time. The BRC further includes a diode (190, 128, 198, 148, 113, 168) connected between a drain of each FET and a terminal of each GDC. The BRC can further include voltage divider circuits (192/188, 130/140, 107/196, 150/160, 115/111, 170/180) and/or voltage clamping devices (121, 131, 123, 133, 125, 135).

17 Claims, 19 Drawing Sheets

U.S. PATENT DOCUMENTS

| | | | |
|---|---|---|---|
| 6,215,271 | B1 | 4/2001 | Lerow et al. |
| 6,320,448 | B1 | 11/2001 | Gantioler |
| 6,353,307 | B1 | 3/2002 | Koelle et al. |
| 6,421,261 | B1 | 7/2002 | Fujisawa et al. |
| 6,549,438 | B2 | 4/2003 | Malone |
| 6,563,726 | B1 * | 5/2003 | Hirst .............................. 363/127 |
| 6,661,208 | B2 | 12/2003 | Rutter et al. |
| 7,075,271 | B2 * | 7/2006 | Urakabe et al. .................. 322/24 |
| 7,084,609 | B2 | 8/2006 | Pillote et al. |
| 7,269,038 | B2 | 9/2007 | Shekhawat et al. |
| 7,292,445 | B2 | 11/2007 | Linke |
| 7,339,804 | B2 | 3/2008 | Uchida |
| 7,388,404 | B1 | 6/2008 | Miller |
| 7,411,768 | B2 | 8/2008 | Sells |
| 7,420,224 | B2 | 9/2008 | Milich et al. |
| 7,443,142 | B2 | 10/2008 | O'Gorman et al. |
| 7,478,254 | B2 | 1/2009 | Kawai |
| 7,561,404 | B2 * | 7/2009 | Sells .............................. 361/246 |
| 7,733,042 | B2 * | 6/2010 | Kanamori ..................... 318/268 |
| 7,920,393 | B2 | 4/2011 | Bendre et al. |
| 2003/0095423 | A1 | 5/2003 | Hirst |
| 2005/0024033 | A1 | 2/2005 | Nakata |
| 2007/0170903 | A1 | 7/2007 | Apfel |
| 2007/0171690 | A1 | 7/2007 | Apfel |
| 2007/0296363 | A1 | 12/2007 | Andrejak et al. |
| 2008/0291699 | A1 | 11/2008 | Sells |
| 2009/0273959 | A1 * | 11/2009 | Sells .............................. 363/127 |
| 2010/0046259 | A1 | 2/2010 | Ho et al. |
| 2010/0046264 | A1 | 2/2010 | Ho et al. |

FOREIGN PATENT DOCUMENTS

WO      WO-97/24795      7/1997

OTHER PUBLICATIONS

Information about Related Patents and Patent Applications, see section 6 of the accompanying Information Disclosure Statement Letter, which concerns Related Patents and Patent Applications.

U.S. Appl. No. 12/567,840, filed Sep. 28, 2009, entitled "Three-Phase Low-Loss Rectifier" to Sells, T.

U.S. Appl. No. 12/636,034, filed Dec. 11, 2009, entitled "N-Phase Active Bridge Circuits Including N-Channel Field Effect Transistors With Active Gate Drive" to Sells, T.

* cited by examiner

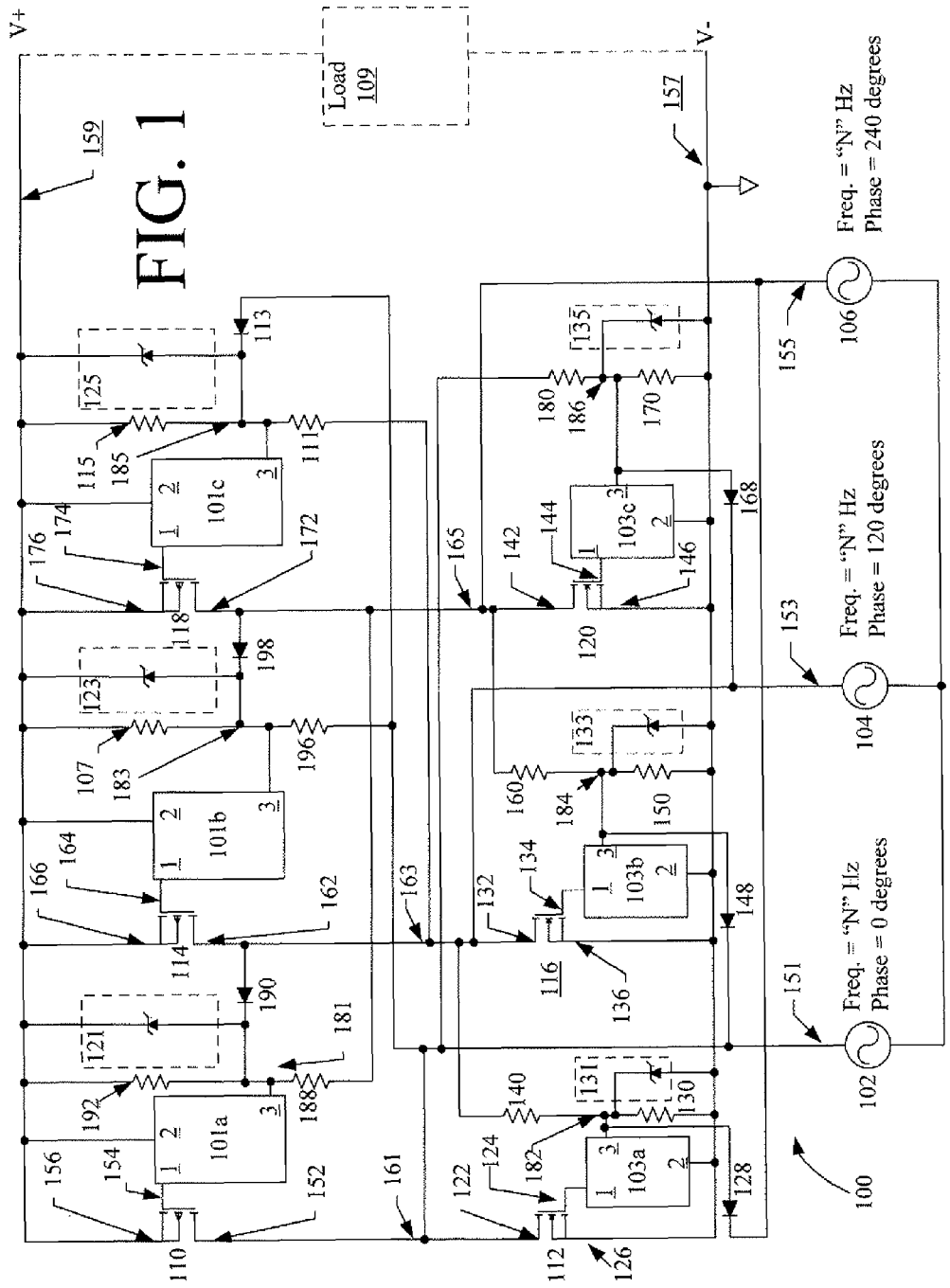

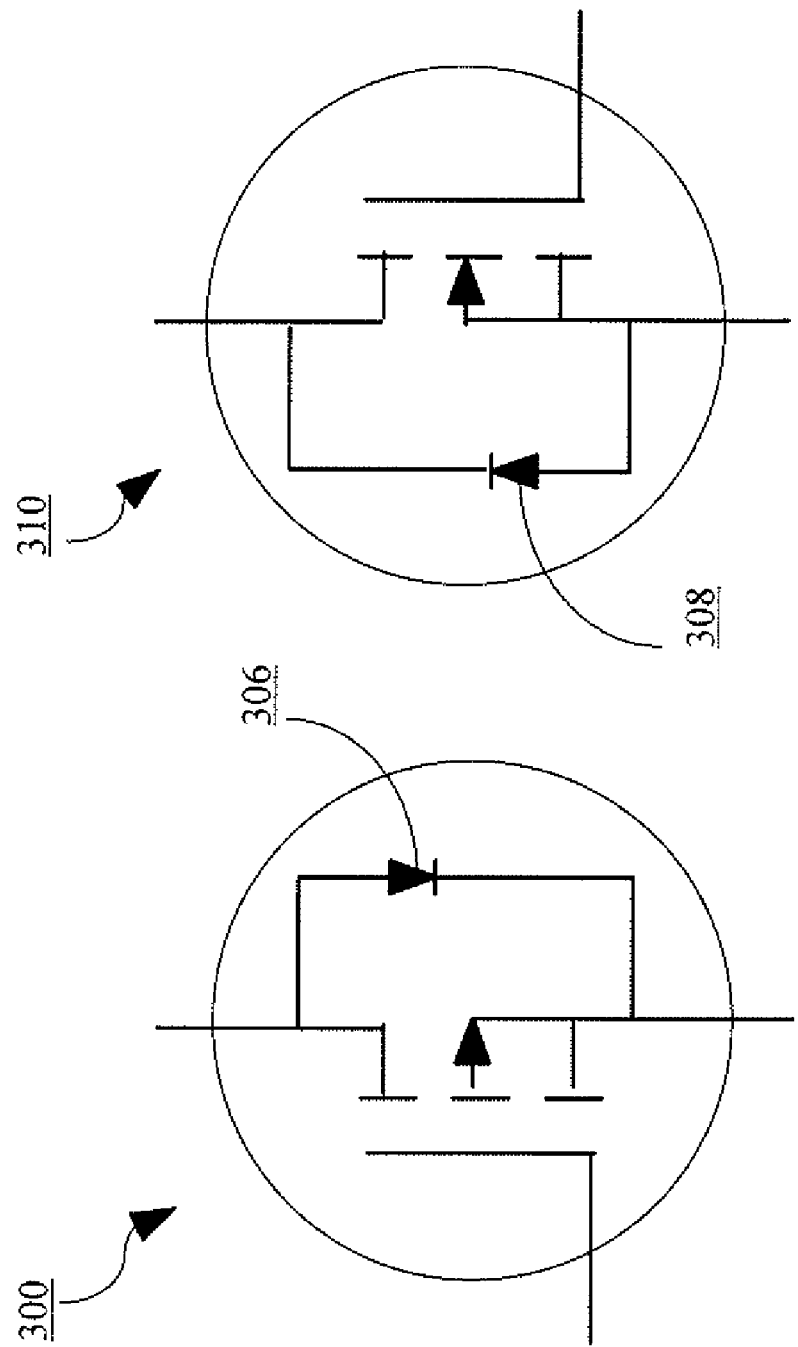

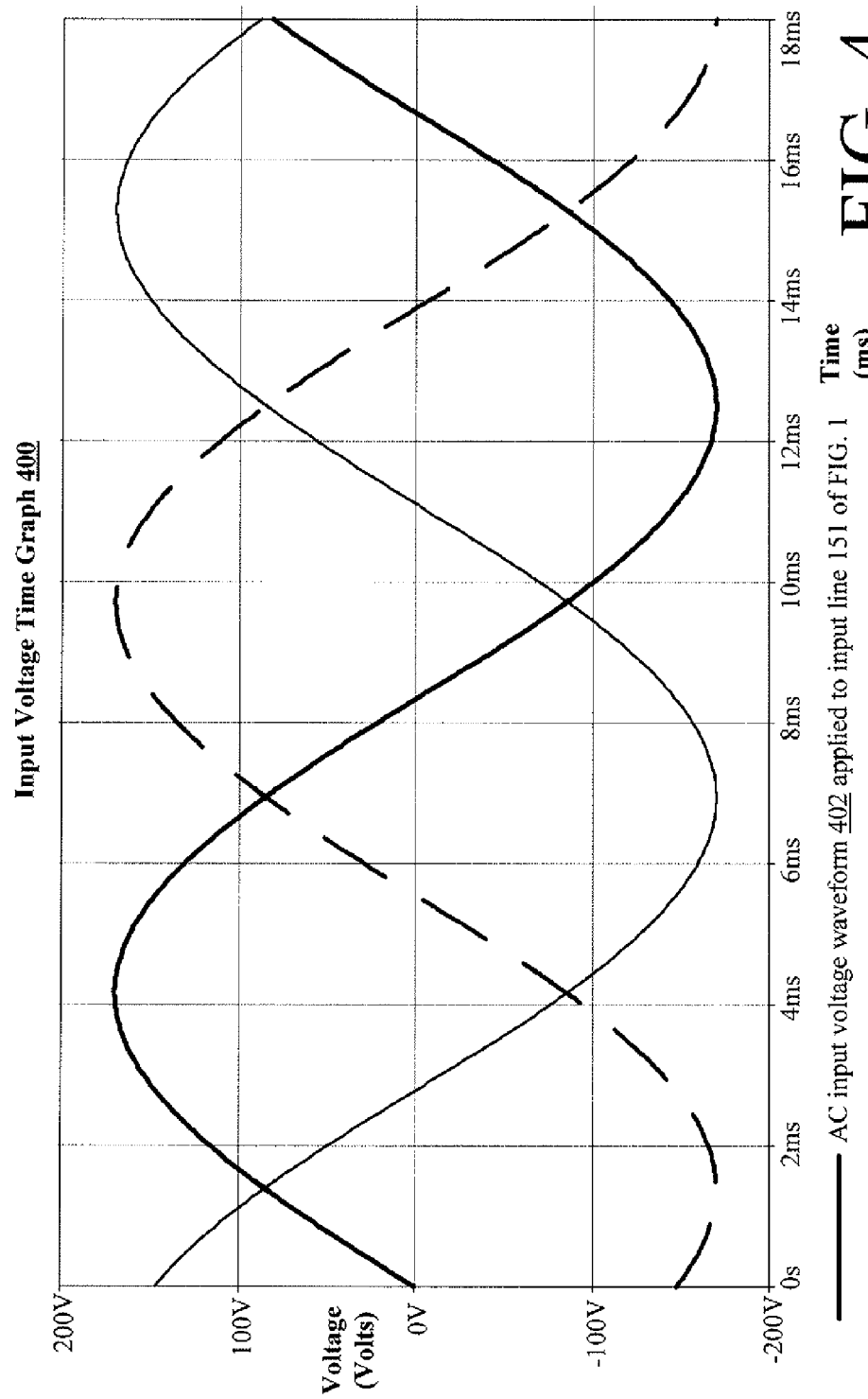

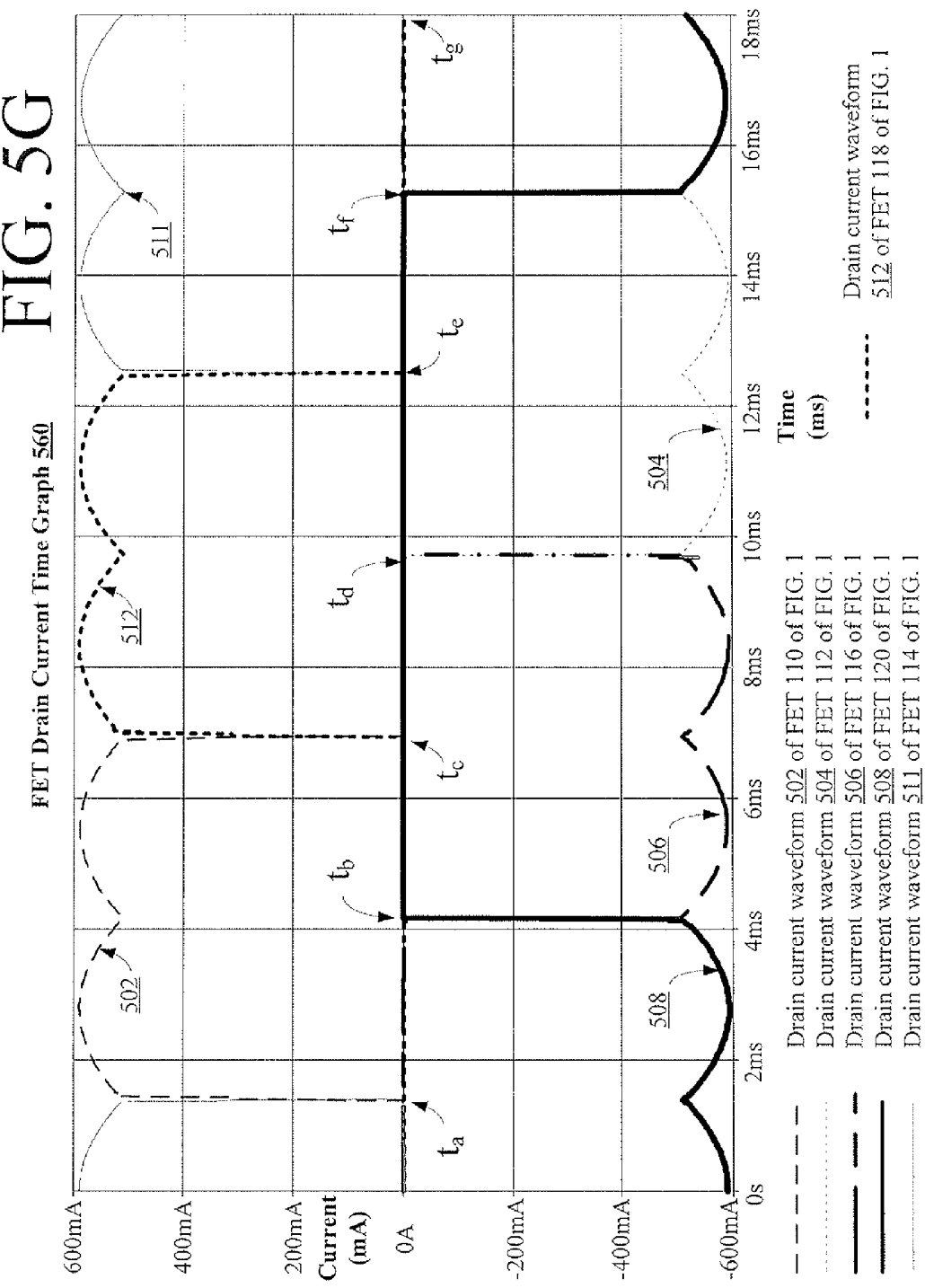

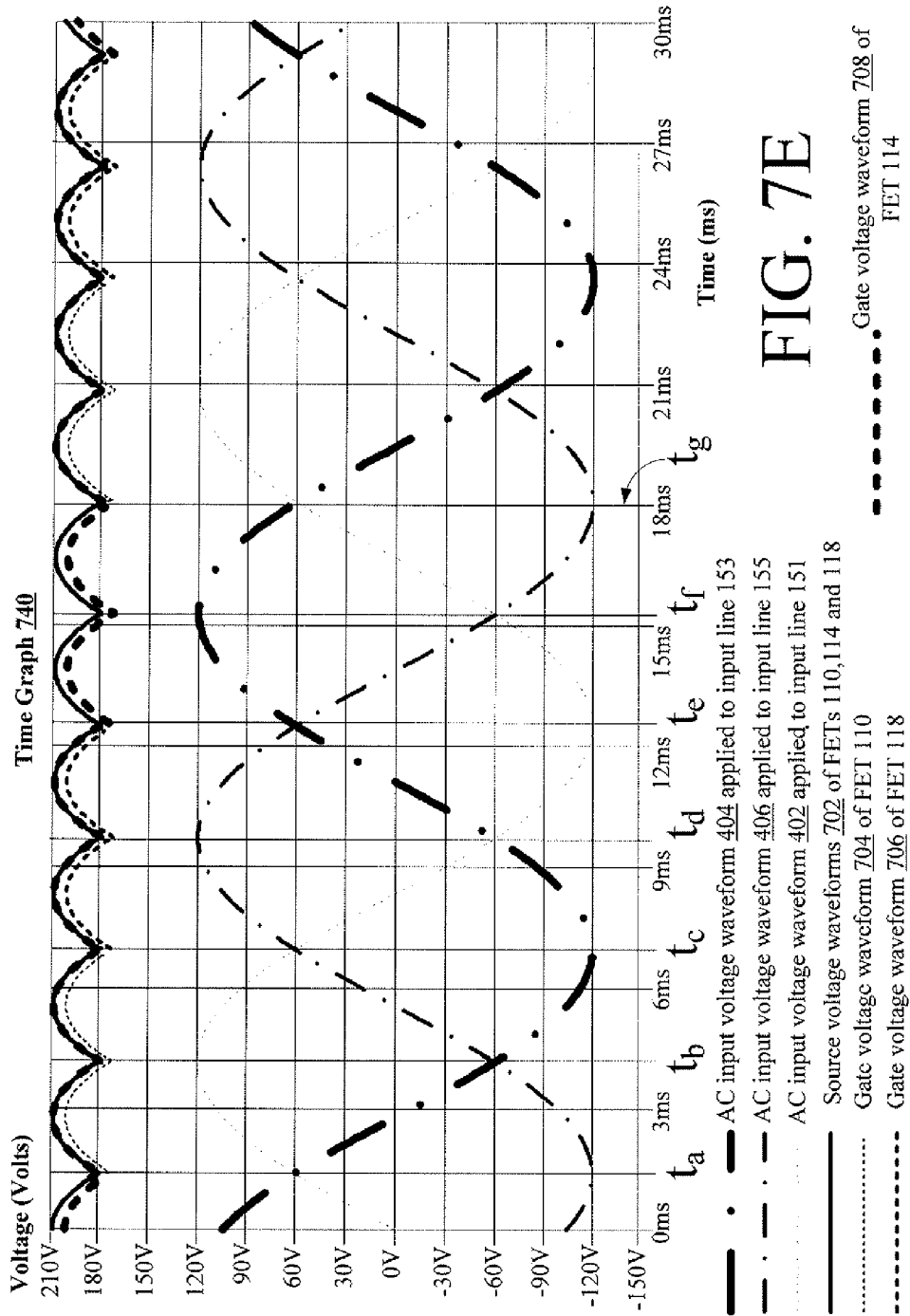

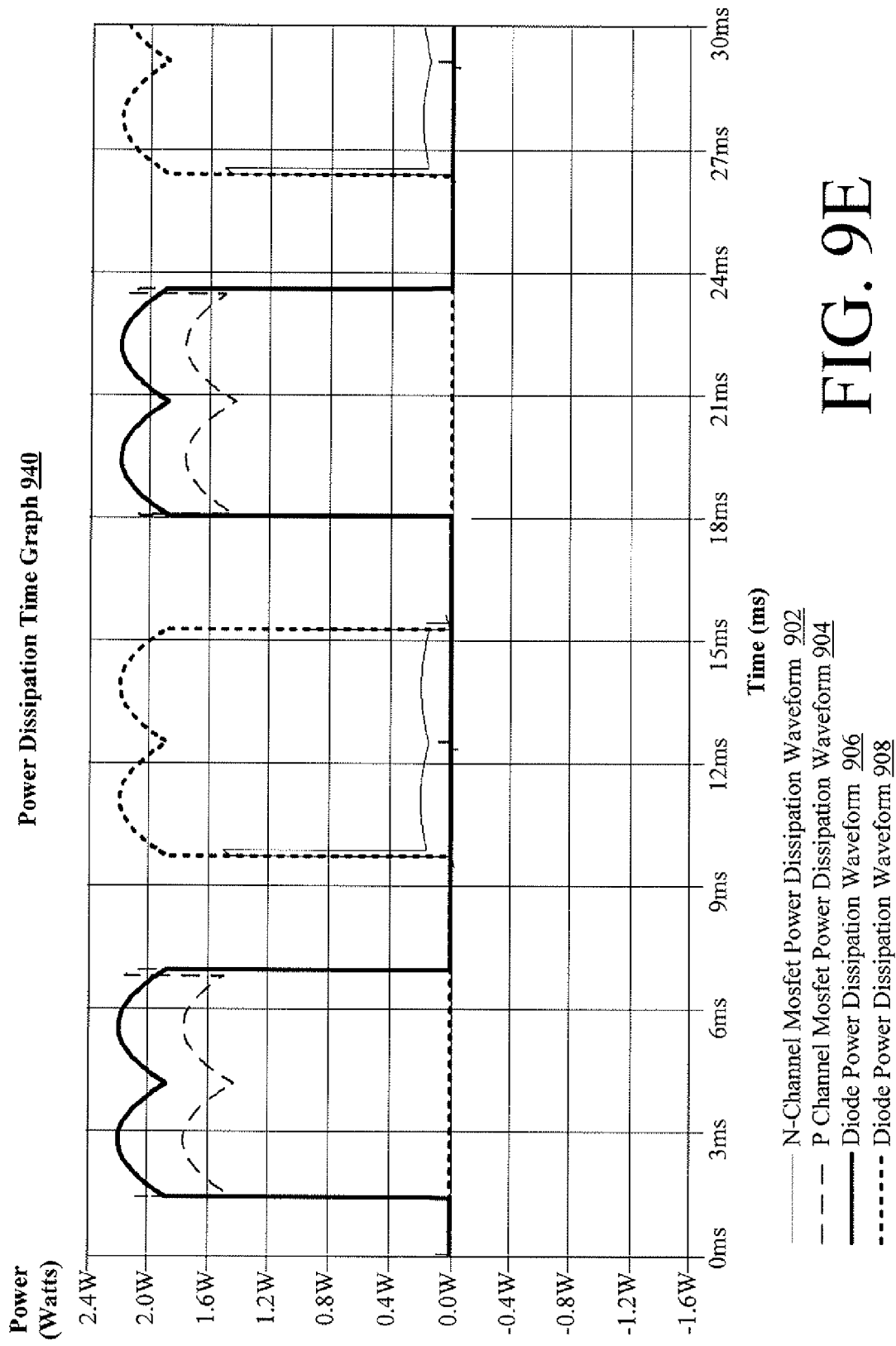

THREE-PHASE LOW-LOSS RECTIFIER WITH ACTIVE GATE DRIVE

BACKGROUND OF THE INVENTION

1. Statement of the Technical Field

The inventive arrangements relate to Metal-Oxide-Semiconductor Field-Effect Transistor (MOSFET) circuits, and more particularly to a circuit for Alternating Current (AC) voltage rectification.

2. Description of the Related Art

Three-phase bridge rectifier type devices are typically used to convert a three-phase AC waveform into a Direct Current (DC) waveform. A schematic illustration of a conventional three-phase bridge rectifier type device is shown in FIG. 10. The three-phase bridge rectifier type devices are supplied three (3) AC voltages that differ in phase by one-third (⅓) of a cycle or one hundred twenty degrees (120°). Such three-phase bridge rectifier type devices often utilize a plurality of three-phase bridge connected diodes to perform the rectification function. The three-phase bridge connected diodes include three (3) positive side diodes and three (3) negative side diodes. During operation, only those diodes belonging to the phases indicative of peak values of the three-phase AC voltages at the respective positive and negative sides are turned on. In effect, a three-phase AC waveform is rectified by the three-phase bridge rectifier circuit. After the three-phase AC waveform is rectified, the output signal is often filtered to remove unwanted spectral content and to produce a DC voltage. A filtering device utilizing capacitor components, resistor components, and/or inductor components is typically used for this purpose.

Despite the various technologies known in the art, there remains a need for a three-phase MOSFET bridge rectifier type device that can rectify a domestic three-phase AC mains (for example, 208V, 60 Hz) and/or a foreign three-phase AC mains (for example, 400V, 50 Hz) with low power loss.

SUMMARY OF THE INVENTION

Embodiments of the present invention concern three-phase transistor active bridge circuits. The three-phase transistor active bridge circuits rectify domestic three-phase AC mains (for example, 208V, 60 Hz) and/or foreign three-phase AC mains (for example, 400V, 50 Hz) with low power loss. The three-phase transistor active bridge circuits are connectable to a three-phase AC voltage source via a plurality of input lines. The three-phase AC voltage source is configured to supply the three-phase bridge rectifier circuit with a plurality of AC voltage waveforms that differ in phase by a certain amount (e.g., 120°). The three-phase transistor active bridge circuits are also connectable to a load via a pair of output lines.

The three-phase transistor active bridge circuits include first, second, third, fourth, fifth and sixth field effect transistors and a plurality of gate drive circuits. A first input line is connected to the drains of the first and second field effect transistors. A second input line is connected to the drains of the third and fourth field effect transistors. A third input line is connected to the drains of the fifth and sixth field effect transistors. The first, third and fifth field effect transistors are of a first channel type. The second, fourth and sixth field effect transistors are of a second channel type. The first channel type is different from the second channel type. Each of the field effect transistors can include, but is not limited to, an enhancement mode MOSFET.

A source-drain path of the first field effect transistor is connected in series with a source-drain path of the second field effect transistor to form a first series transistor combination connected across the pair of output lines. A source-drain path of the third field effect transistor is connected in series with a source-drain path of the fourth field effect transistor to form a second series transistor combination connected across the pair of output lines. A source-drain path of the fifth field effect transistor is connected in series with a source-drain path of the sixth field effect transistor to form a third series transistor combination connected across the pair of output lines. Notably, each of the first, third and fifth field effect transistors is switched to its "off" state before a respective second, fourth and sixth field effect transistor is switched to its "on" state, and vise versa. Consequently, cross conduction of each series transistor combination does not occur during the "on/off" state transitions thereof.

The gate drive circuits are configured to supply a voltage to gates of the field effect transistors for switching the field effect transistors to their "on" states at certain times. Each gate driver circuit has a first terminal connected to a gate of the respective field effect transistor, a second terminal connected to a source of a respective field effect transistor, and a third terminal connected to a respective voltage tap.

The three-phase bridge rectifier circuits also include a plurality of voltage divider circuits. Each voltage divider circuit is provided for a respective field effect transistor. Each voltage divider circuit includes a first resistor and a second resistor connected in series from the source of the respective field effect transistor to a first input line. A drain of each one of the field effect transistors is connected to a second input line different from the first input line. A source of each field effect transistor is connected to the first resistor of a respective voltage divider circuit. The second resistor of the respective voltage divider circuit is connected to the first input line. Each third terminal of the gate drive circuits is connected to an interconnection point between the first and second resistors of a respective voltage divider circuit.

The three-phase bridge rectifier circuits further include a plurality of diodes and/or a plurality of voltage clamping devices. Each diode is connected between a drain of a field effect transistor and the third terminal of a gate drive circuit. Each voltage clamping device is connected between the third terminal of a gate drive circuit and a respective one of the output lines.

According to an aspect of the present invention, each gate drive circuit includes a level detector circuit. The level detector circuit is generally configured for providing a gate control output signal for each field effect transistor to selectively switch the field effect transistor between an "on" state and an "off" state. The level detector circuit can include, but is not limited to, a comparator. Each gate drive circuit can also include a resistor connected between an output terminal of the level detector circuit and a positive power supply terminal of the level detector circuit. Each gate drive circuit can further include a gate driver device (e.g., a high peak-current amplifier) excited by the level detector circuit. The gate driver device is configured for driving said field effect transistor by supplying a voltage having an "on state" voltage value to a gate of the field effect transistor.

BRIEF DESCRIPTION OF THE DRAWINGS

Embodiments will be described with reference to the following drawing figures, in which like numerals represent like items throughout the figures, and in which:

FIG. 1 is a schematic representation of an exemplary three-phase bridge rectifier circuit with active gate drive.

FIG. 3A is a schematic representation of a P-channel MOSFET having an intrinsic body diode.

FIG. 3B is a schematic representation of an N-channel MOSFET having an intrinsic body diode.

FIG. 4 is a time graph showing three (3) exemplary AC input voltage waveforms of the three-phase bridge rectifier circuit shown in FIG. 1.

FIG. 5G is a time graph showing each of the drain current waveforms shown in FIGS. 5A-5F that is useful for understanding when each field effect transistor of FIG. 1 is switched to its "on" state relative to the other field effect transistors.

FIG. 7E is a time graph showing that a FET "on/off" state transition process is at least partially defined by the polarity of the AC voltage waveforms shown in FIG. 4 and the intersections thereof.

FIG. 9E is a time graph showing the power dissipation waveforms of FIGS. 9A-9D overlapping each other.

DETAILED DESCRIPTION

Figure 6:
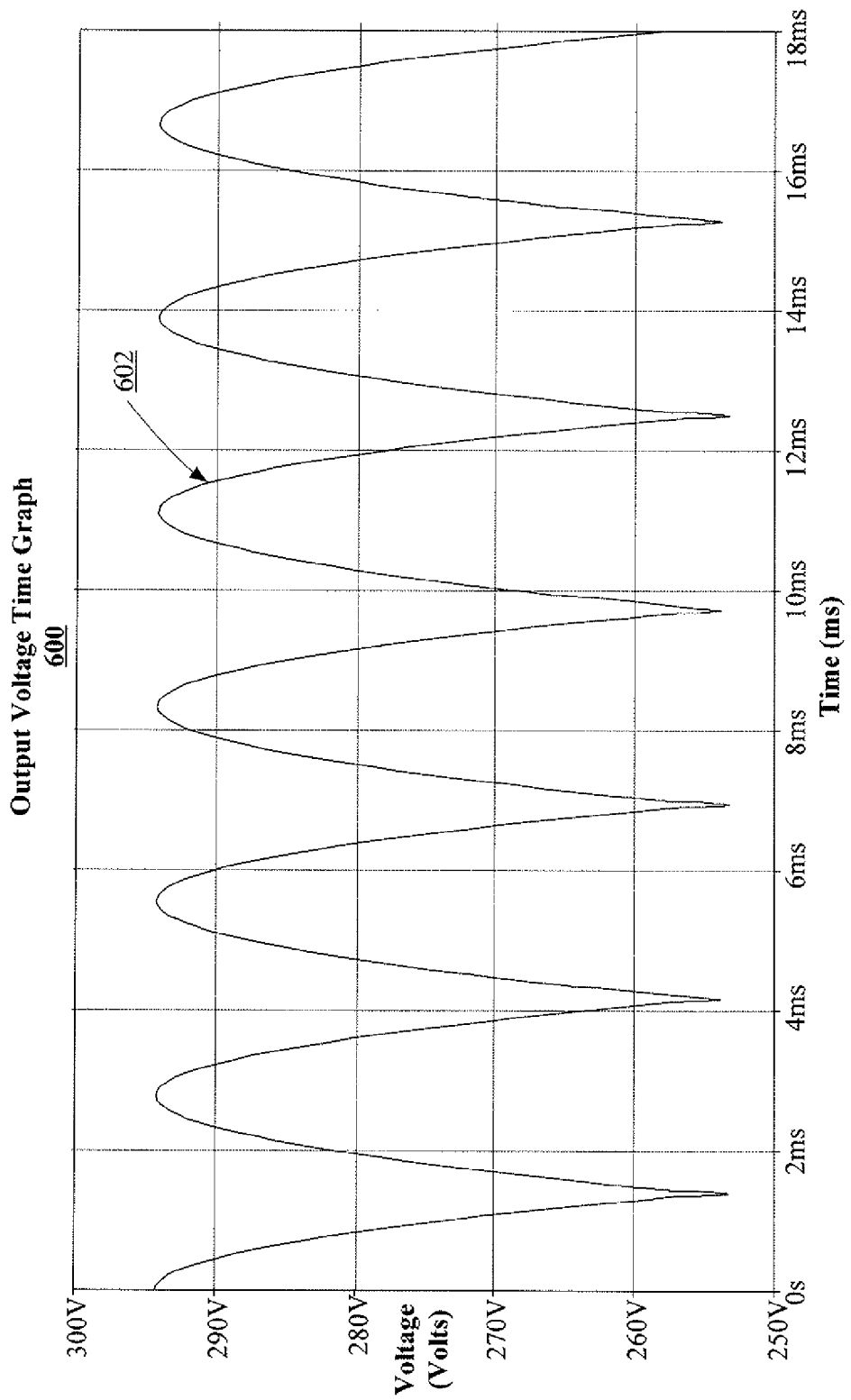
FIG. 6 is a time graph showing an exemplary DC output voltage waveform of the three-phase bridge rectifier circuit shown in FIG. 1.

A three-phase bridge rectifier circuit 100 is shown in FIG. 1. The three-phase bridge rectifier circuit 100 shown in FIG. 1 is useful for a variety of purposes, including rectification of domestic three-phase AC mains (for example, 208V, 60 Hz) and/or foreign three-phase AC mains (for example, 400V, 50 Hz) with low power loss. As may be observed in FIG. 1, the three-phase bridge rectifier circuit 100 is supplied three (3) AC voltages that differ in phase by one-third (⅓) of a cycle or one hundred twenty degrees (120°). As such, the three-phase bridge rectifier circuit 100 is connectable to at least one AC voltage source 102, 104, 106 via three (3) input lines 151, 153, 155. The AC voltage sources 102, 104 and 106 shown in FIG. 1 can collectively comprise a single three-phase AC voltage source (e.g., a three-phase transformer). In this scenario, the three-phase bridge rectifier circuit 100 is supplied with a first AC voltage waveform having a phase shift of zero degrees (0°), a second AC voltage waveform having a phase shift of one hundred twenty degrees (120°), and a third AC voltage waveform having a phase shift of two hundred forty degrees (240°). Each of the AC voltage waveforms has the same frequency "N" expressed in Hertz (e.g., 60 Hz). An input voltage time graph 400 showing exemplary AC input voltage waveforms 402, 404, 406 supplied to the three-phase bridge rectifier circuit 100 by AC voltage source(s) 102, 104, 106 is provided in FIG. 4. Notably, the AC input voltage waveforms 402, 404, 406 are measured differentially across the AC voltage source(s) 102, 104, 106 and not with respect to ground. The three-phase bridge rectifier circuit 100 is also connectable between a pair of output lines 159, 157. The output lines 159, 157 can be connected across a load 109 so that the load 109 can be supplied a DC output voltage of the three-phase bridge rectifier circuit 100. An output voltage time graph 600 showing an exemplary output voltage waveform 602 of the three-phase bridge rectifier circuit 100 is provided in FIG. 6.

As shown in FIG. 1, the three-phase bridge rectifier circuit 100 includes a plurality of field effect transistors 110, 114, 118 of a first channel type. The three-phase bridge rectifier circuit 100 also includes a plurality of field effect transistors 112, 116, 120 of a second channel type that is different from the first channel type. For example, first, third and fifth field effect transistors 110, 114, 118 can be a P-channel type, whereas the second, fourth and sixth field effect transistors 112, 116, 120 can be an N-channel type. Each of the field effect transistors 110, 112, 114, 116, 118, 120 can be enhancement mode devices. For example, the N-channel type transistor can be model number IXFX90N30, which is available from IXYS Corporation of Milpitas, Calif. The P-channel device can be IXTK40P50P, which is also available from IXYS Corporation of Milpitas, Calif. Still, it should be understood that other types of field effect transistors can also be selected depending upon the anticipated voltage and current handling requirements of the three-phase bridge rectifier circuit 100.

As will be understood by those having ordinary skill in the art, each of the field effect transistors 110, 112, 114, 116, 118, 120 will have three (3) terminals respectively defined as a source, gate and drain. With regard to the first field effect transistor 110, the source, gate and drain terminals are respectively identified with reference numbers 156, 154 and 152. The source, gate and drain terminals of third and fifth field effect transistors 114 and 118 are respectively identified as 166, 164, 162 and 176, 174, 172. With regard to the second field effect transistor 112, the source, gate and drain terminals are respectively identified with reference numbers 126, 124, 122. The source, gate and drain terminals of fourth and sixth field effect transistors 116 and 120 are respectively identified as 136, 134, 132 and 146, 144, 142.

An electrical path can be provided from the source to the drain of each field effect transistor 110, 112, 114, 116, 118, 120. This path is generally referred to herein as the source-drain path. Although not always shown in schematic illustrations, field effect transistor devices, such as MOSFETs, typically have an intrinsic body diode that results from the manner in which the field effect transistor devices are manufactured. This intrinsic body diode 306, 308 is illustrated in FIGS. 3A and 3B for a P-channel MOSFET 300 and N-channel MOSFET 310.

Referring again to FIG. 1, it can be observed that a source-drain path of first field effect transistor 110 can be connected in series with a source-drain path of the second field effect transistor 112. The series connected transistor pair 110, 112 form a first series transistor combination that can be connected across the output lines 159, 157. A source-drain path of the third field effect transistor 114 can be connected in series with a source-drain path of the fourth field effect transistor 116 to form a second series transistor combination connected across the output lines 159, 157. A source-drain path of the fifth field effect transistor 118 can be connected in series with a source-drain path of the sixth field effect transistor 120 to form a third series transistor combination connected across the output lines 159, 157.

As noted above, the three-phase bridge rectifier circuit 100 has three (3) input lines 151, 153, 155 electrically coupled to at least one AC voltage source 102, 104, 106. A first one of the input lines 151 is connected to the first series combination 110, 112 at an interconnection point 161 between the first and the second field effect transistors 110, 112. A second one of the input lines 153 can be connected to the second series combination 114, 116 at an interconnection point 163 between the third and fourth field effect transistors 114, 116. A third one of the input lines 155 can be connected to the third series combination 118, 120 at an interconnection point 165 between the fifth and sixth field effect transistors 118, 120.

A gate driver circuit 101a, 103a, 101b, 103b, 101c, 103c is provided for each field effect transistor 110, 112, 114, 116, 118, 120. A terminal 1 of each gate driver circuit 101a, 103a, 101b, 103b, 101c, 103c is connected to a gate 154, 124, 164, 134, 174, 144 of a respective field effect transistor 110, 112, 114, 116, 118, 120. A terminal 2 of each gate driver circuit 101a, 103a, 101b, 103b, 101c, 103c is also connected to a respective one of the output lines 159, 157. A terminal 3 of each gate driver circuit 101a, 103a, 101b, 103b, 101c, 103c is coupled to a source 156, 126, 166, 136, 176, 146 of a respective field effect transistor 110, 112, 114, 116, 118, 120 via a resistor 192, 130, 107, 150, 115, 170. As will be described below, the resistors 192, 130, 107, 150, 115, 170 comprise a portion of a voltage divider for the field effect transistors 110, 112, 114, 116, 118, 120. As such, the terminal 3 of each gate driver circuit 101a, 103a, 101b, 103b, 101c, 103c is directly connected to a voltage tap 181, 182, 183, 184, 185, 186 provided by the voltage divider.

Each gate driver circuit 101a, 103a, 101b, 103b, 101c, 103c is generally configured to supply a voltage to the gate 154, 124, 164, 134, 174, 144 of a respective field effect transistor 110, 112, 114, 116, 118, 120 at certain times for switching the field effect transistor to its "on" state or "off" state. The voltage applied to the gate 154, 124, 164, 134, 174, 144 of a respective field effect transistor 110, 112, 114, 116, 118, 120 has an "on state" or "off state" voltage value (e.g., 0 volts, 8.2 volts or 12 volts) selected in accordance with a particular field effect transistor 110, 112, 114, 116, 118, 120 application. Each gate driver circuit 101a, 103a, 101b, 103b, 101c, 103c is also generally configured to stop supplying the voltage to the gate 154, 124, 164, 134, 174, 144 of a respective field effect transistor 110, 112, 114, 116, 118, 120 at certain times for switching the field effect transistor to its "on" state or its "off" state. An exemplary embodiment of the gate driver circuits 101a, 101b, 101c will be described in detail below in relation to FIG. 2A. Similarly, an exemplary embodiment of the gate driver circuits 103a, 103b, 103c will be described in detail below in relation to FIG. 2B. The FET "on/off" state switching scheme and transition process will be described in detail below in relation to FIGS. 5, 7 and 8.

The circuit 100 further includes a plurality of devices for ensuring that each of the field effect transistors 110, 112, 114, 116, 118, 120 is switched to its "on" and "off" states at desirable times. These devices can include, but are not limited to, voltage divider circuits 192/188, 130/140, 107/196, 150/160, 115/111, 170/180 and diodes 190, 128, 198, 148, 113, 168.

As shown in FIG. 1, a voltage divider circuit is provided for each of the gate driver circuits 101a, 103a, 101b, 103b, 101c, 103c. Each of the voltage divider circuits can be comprised of a first resistor and a second resistor connected in series. However, those having ordinary skill in the art will appreciate that numerous different types of voltage dividers circuits are possible and can be used for the purposes as hereinafter described. The voltage divider circuit for the first field effect transistor 110 can include first resistor 192 and second resistor 188. The voltage divider circuit for the second field effect transistor 112 can include first resistor 130 and a second resistor 140. The voltage divider circuit for the third field effect transistor 114 can include a first resistor 107 and a second resistor 196. The voltage divider circuit for the fourth field effect transistors 116 can include a first resistor 150 and a second resistor 160. The voltage divider circuit for the fifth field effect transistors 118 can include a first resistor 115 and a second resistor 111. The voltage divider circuit for the sixth field effect transistors 120 can include a first resistor 170 and a second resistor 180.

In FIG. 1, the first and second resistors are connected in series from a source 156, 126, 166, 136, 176, 146 of each field effect transistor 110, 112, 114, 116, 118, 120 to one of the input lines 151, 153, 155. For example, the resistor combination 192, 188 is connected from source 156 of field effect transistor 110 to input line 155. The resistor combination 130, 140 is connected from source 126 of field effect transistor 112 to input line 153. The resistor combination 107, 196 is connected from source 166 of field effect transistor 114 to input line 151. The resistor combination 150, 160 is connected from source 136 of field effect transistor 116 to input line 155. The resistor combination 115, 111 is connected from source 176 of field effect transistor 118 to input line 153. The resistor combination 170, 180 is connected from source 146 of field effect transistor 120 to input line 151.

Each voltage divider advantageously provides a voltage tap 181, 182, 183, 184, 185, 186. For example, if a resistive voltage divider is used as shown in FIG. 1, then the voltage tap 181, 182, 183, 184, 185, 186 can be provided at a connection point between the first and second resistors. The voltage tap 181, 182, 183, 184, 185, 186 of each voltage divider is connected to a terminal 3 of a respective gate drive circuit 101a, 103a, 101b, 103b, 101c, 103c. Consequently, the voltage tap 181, 182, 183, 184, 185, 186 advantageously provides a substantially reduced voltage output relative to the input voltage applied to the circuit 100 by AC voltage source(s) 102, 104, 106. For example, each of the voltage taps 181, 182, 183, 184, 185, 186 of a respective voltage divider can provide an output that is reduced by 10% to 90% relative to the input voltage.

Notably, the circuit 100 is not limited to any particular range of voltage reduction by the voltage divider. The purpose of the voltage divider is to permit a relatively larger range of input voltages to be applied to the circuit 100 via input lines 151, 153, 155 without producing excessively high voltage levels at a terminal 3 of a gate drive circuit 101a, 103a, 101b, 103b, 101c, 103c. However, the voltage divider should still produce a voltage at a terminal 3 of a gate drive circuit 101a, 103a, 101b, 103b, 101c, 103c that is of sufficient magnitude to indicate when a respective field effect transistor is to be switched to its "on" state. For example, the first resistor 192, 130, 107, 150, 115, 170 can be selected to be about one hundred kilo Ohms (100 kΩ) and the second resistor 188, 140, 196, 160, 111, 180 can be selected to be about fifty kilo Ohms (50 kΩ). In this scenario, the circuit 100 can include optional voltage clamping circuits 121, 131, 123, 133, 125, 135 (described below). Alternatively, the first resistor 192, 130, 107, 150, 115, 170 can be selected to be about fifty kilo Ohms (50 kΩ) and the second resistor 188, 140, 196, 160, 111, 180 can be selected to be about four hundred kilo Ohms (400 kΩ). In this scenario, the circuit 100 can be absent of optional voltage clamping circuits 121, 131, 123, 133, 125, 135 (described below). Still, those having ordinary skill in the art will appreciate that a variety of other voltage divider values can and should be used depending upon the design criteria for input voltage range and transistor specifications.

The optional voltage clamping circuits 121, 131, 123, 133, 125, 135 can be provided to ensure that the voltage applied to the terminals 3 of the gate drive circuits 101a, 103a, 101b, 103b, 101c, 103c does not become excessively large as the three-phase AC input voltage is increased. Any suitable voltage clamping circuit can be used for this purpose. For example, each of the voltage clamping circuits could be simply implemented as a zener diode 121, 131, 123, 133, 125, 135 that is connected in parallel with a first resistor 192, 130, 107, 150, 115, 170 between a terminal 3 of a respective gate drive circuit 101a, 103a, 101b, 103b, 101c, 103c and a source 156, 126, 166, 136, 176, 146 of a respective field effect transistor 110, 112, 114, 116, 118, 120.

The zener diodes 121, 131, 123, 133, 125, 135 can ensure that the voltage between the terminals 3 of the gate drive circuits 101a, 103a, 101b, 103b, 101c, 103c and the source terminals 156, 126, 166, 136, 176, 146 of the field effect transistors 110, 112, 114, 116, 118, 120 is limited. For example, each of the zener diodes 121, 131, 123, 133, 125, 135 can prevent the voltage between a terminal 3 of a respective gate drive circuit 101a, 103a, 101b, 103b, 101c, 103c and a source 156, 126, 166, 136, 176, 146 of a respective field effect transistor 110, 112, 114, 116, 118, 120 from exceeding a predetermined threshold voltage defined by the reverse breakdown voltage of the zener diode 121, 131, 123, 133, 125, 135.

A further advantage of using a voltage clamp as described herein is it allows adequate voltage levels to be developed between the terminals 3 of the gate drive circuits 101a, 103a, 101b, 103b, 101c, 103c and the source terminals 156, 126, 166, 136, 176, 146 of the field effect transistors 110, 112, 114, 116, 118, 120, even with relatively low input voltages applied to the circuit 100 via input lines 151, 153, 155. For example, the voltage divider can be designed to allow a relatively large proportion of the input voltage (e.g., 70%) to appear at a voltage tap 181, 182, 183, 184, 185, 186. The larger proportion of voltage ensures that the gate driver circuits 101a, 103a, 101b, 103b, 101c, 103c will switch the field effect transistors 110, 112, 114, 116, 118, 120 to their "on" state or "off" state at the appropriate times, even with relatively low input voltages from the AC voltage source(s) 102, 104, 106. In order to ensure that this larger proportion of voltage does not damage the gate driver circuits 101a, 103a, 101b, 103b, 101c, 103c when considerably higher input voltages are applied to the circuit 100, the clamping circuit (zener diode 121, 131, 123, 133, 125, 135 in FIG. 1) can clamp the output of the voltage divider at a predetermined level.

The diodes 190, 128, 198, 148, 113, 168 are provided to ensure that each of the field effect transistors 110, 112, 114, 116, 118, 120 is switched to its "on" state at desirable times. Accordingly, a first diode 190 is connected between the AC voltage source 104 to the terminal 3 of the gate drive circuit 101a for the first field effect transistor 110. A second diode 128 is connected between the AC voltage source 106 and the terminal 3 of the gate drive circuit 103a for the second field effect transistor 112. A third diode 198 is connected between the AC voltage source 106 and the terminal 3 of the gate drive circuit 101b for third field effect transistor 114. A fourth diode 148 is connected between the AC voltage source 102 and the terminal 3 of the gate drive circuit 103b for the fourth field effect transistor 116. A fifth diode 113 is connected between the AC voltage source 102 and the terminal 3 of the gate drive circuit 101c for the fifth field effect transistor 118. A sixth diode 168 is connected between the AC voltage source 104 and the terminal 3 of the gate drive circuit 103c for the sixth field effect transistor 120. The importance of the diodes 190, 128, 198, 148, 113, 168 will become clear in the discussion below regarding the detailed operation of the circuit 100.

Figures 2A, 2B:
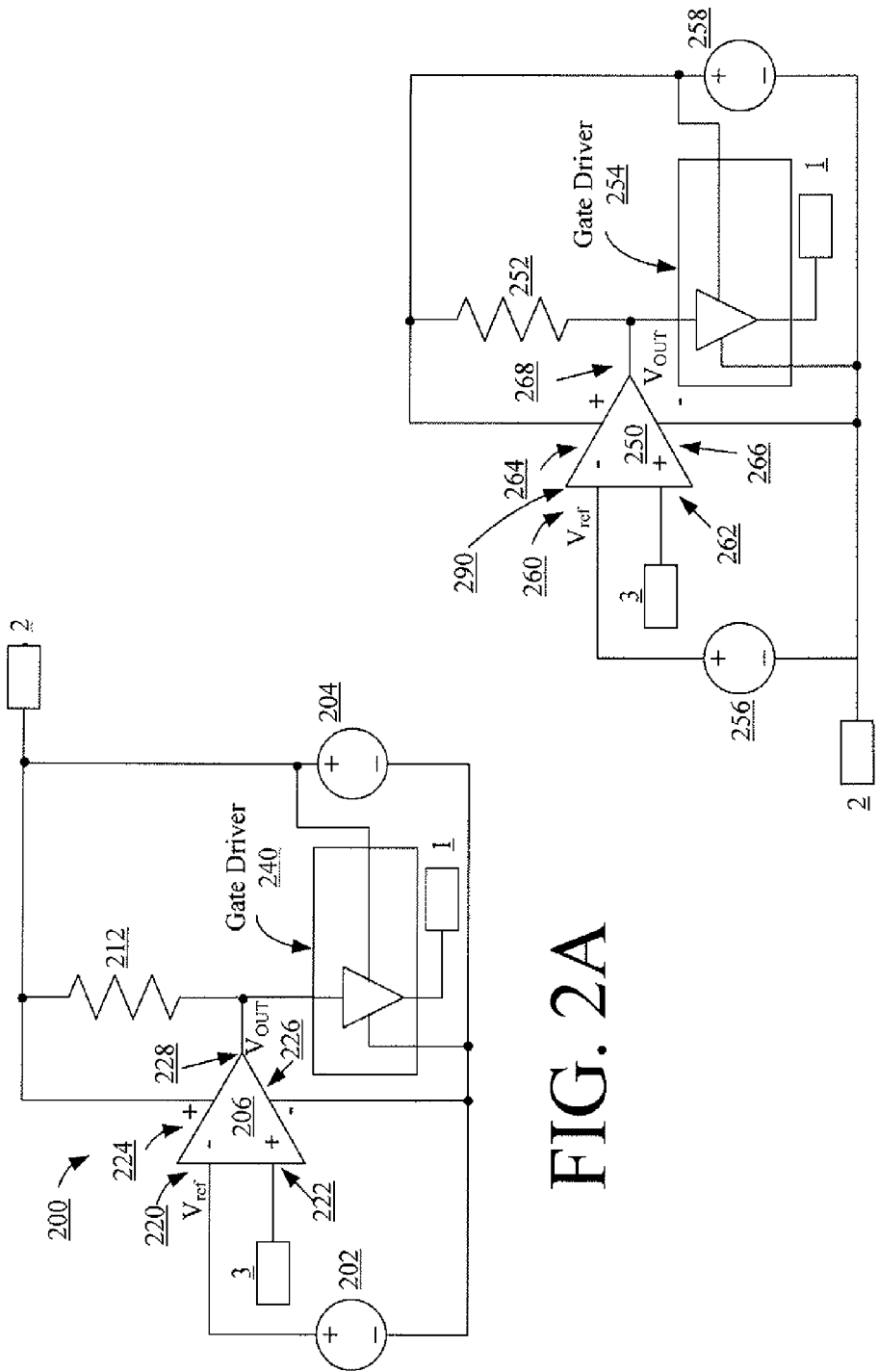
FIG. 2A is a schematic representation of an exemplary gate drive circuit for P-channel field-effect transistors.
FIG. 2B is a schematic representation of an exemplary gate drive circuit for N-channel field-effect transistors.

Referring now to FIG. 2A, there is provided a schematic illustration of an exemplary embodiment of the gate drive circuit 200 for P-channel field-effect transistors. Gate drive circuits 101a, 101b and 101c of FIG. 1 can be the same as or substantially similar to the gate drive circuit 200. As such, the following description of the gate drive circuit 200 is sufficient for understanding the gate drive circuits 101a, 101b and 101c of FIG. 1.

As shown in FIG. 2A, the gate drive circuit 200 includes a level detector circuit 206, a resistor 212 and an optional gate driver 240. The level detector circuit 206 is preferably a comparator circuit. Still, embodiments of the present invention are not limited in this regard. The level detector circuit 206 can be comprised of any voltage comparator circuit known in the art, provided that it has suitable specifications for a particular three-phase bridge rectifier application.

Referring again to FIG. 2A, the level detector circuit 206 is comprised of an inverting input terminal 220, a non-inverting input terminal 222, a positive power supply terminal 224, a negative power supply terminal 226 and an output terminal 228. The inverting input terminal 220 is electrically coupled to a reference voltage source 202. The reference voltage source 202 is configured to supply a reference voltage ($V_{ref-1}$) to the level detector circuit 206. The reference voltage $V_{ref-1}$ can be selected to have any value (e.g., 1.2 Volts) in accordance with a particular three-phase bridge rectifier application. The non-inverting input terminal 222 can be electrically coupled to a voltage tap (e.g., voltage tap 181 shown in FIG. 1) of a voltage divider circuit (e.g., the voltage divider circuit 192/188 shown in FIG. 1).

As shown in FIG. 2A, the positive power supply terminal 224 is coupled to a positive terminal of a power supply 204. The negative power supply terminal 226 is coupled to a negative terminal of the power supply 204. As such, an input power supply voltage (e.g., 8.2 Volts) is coupled directly across the positive power supply terminal 224 and the negative power supply terminal 226 of the level detector circuit 206. The output voltage ($V_{OUT}$) of the level detector circuit 206 is forced to either the level detector circuit's positive saturation level or negative saturation level. For example, if a voltage at the non-inverting input terminal 222 is more positive than a voltage of the inverting input terminal 220, the output voltage $V_{OUT}$ is forced to the level detector circuit's positive saturation level (i.e., the value of the input power supply voltage). Alternatively, if a voltage at the non-inverting input terminal 222 is less positive than a voltage at inverting input terminal 220, then the output voltage $V_{OUT}$ is forced to the level detector circuit's negative saturation level (i.e., 0 Volts).

The output voltage $V_{OUT}$ is communicated from the level detector circuit 206 to the optional gate driver 240 or a gate (e.g., gate 154 shown in FIG. 1) of a P-channel field-effect transistor (e.g., the field effect transistor 110 shown in FIG. 1). If the output voltage $V_{OUT}$ is forced to the level detector circuit's positive saturation level, then the P-channel field-effect transistor (e.g., the field-effect transistor 110 shown in FIG. 1) is switched to its "off" state. In contrast, if the output voltage $V_{OUT}$ is forced to the level detector circuit's negative saturation level, then the P-channel field-effect transistor (e.g., the field-effect transistor 110 shown in FIG. 1) is switched to its "on" state. Notably, the gate drive circuit 200 advantageously provides a three-phase bridge rectifier circuit 100 with decreased P-channel MOSFET turn "on" and "off" times.

Gate drivers are well known to those having ordinary skill in the art, and therefore will not be described in detail herein. However, it should be understood that the gate driver 240 is generally configured to drive a P-channel field-effect transistor (e.g., the field-effect transistor 110 shown in FIG. 1) in "on/off" state switching applications by supplying a voltage having an "on state" voltage value or an "off state" voltage value to the gate (e.g., gate 154 shown in FIG. 1) of the P-channel field-effect transistor (e.g., the field-effect transistor 110 shown in FIG. 1). According to embodiments of the present invention, the gate driver 240 can include, but is not limited to, a gate driver having a part number FAN3122 available from Fairchild Semiconductor Corporation of San Jose, Calif.

Referring now to FIG. 2B, there is provided a schematic illustration of an exemplary embodiment of the gate drive circuit 290 for N-channel field-effect transistors. Gate drive circuits 103a, 103b and 103c of FIG. 1 can be the same as or substantially similar to the gate drive circuit 290. As such, the following discussion of the gate drive circuit 290 is sufficient for understanding the gate drive circuits 103a, 103b and 103c.

As shown in FIG. 2B, the gate drive circuit 290 includes a level detector circuit 250, a resistor 252 and an optional gate driver 254. The level detector circuit 250 is preferably a comparator circuit. Still, embodiments of the present invention are not limited in this regard. The level detector circuit 250 can be comprised of any voltage comparator circuit known in the art, provided that it has suitable specifications for a particular three-phase bridge rectifier application.

The level detector circuit 250 is the same as or substantially similar to the level detector circuit 206 of FIG. 2A. As such, the description of the level detector circuit 206 provided above in relation to FIG. 2A is sufficient for understanding the level detector circuit 250. Similarly, the gate driver 254 is the same as or substantially similar to the gate driver 240 of FIG. 2A. Accordingly, the description of the gate driver 240 provided above in relation to FIG. 2A is also sufficient for understanding the gate driver 254. However, it should be understood that the gate driver 254 can include, but is not limited to, a gate driver having a part number FAN3122 available from Fairchild Semiconductor Corporation of San Jose, Calif.

It should also be understood that the level detector circuit 250 is comprised of an inverting input terminal 260, a non-inverting input terminal 262, a positive power supply terminal 264, a negative power supply terminal 266 and an output terminal 268. The inverting input terminal 260 is electrically coupled to a reference voltage source 256. The reference voltage source 256 is configured to supply a reference voltage ($V_{ref-2}$) to the level detector circuit 250. The reference voltage $V_{ref-2}$ can be selected to have any value (e.g., 1.2 Volts) in accordance with a particular three-phase bridge rectifier application. The non-inverting input terminal 262 can be electrically coupled to a voltage tap (e.g., the voltage tap 182 of FIG. 1) of a voltage divider circuit (e.g., the voltage divider circuit 130/140 shown in FIG. 1). The positive power supply terminal 264 is coupled to a positive terminal of a power supply 258. The negative power supply terminal 266 is coupled to a negative terminal of the power supply 258. As such, an input power supply voltage (e.g., 8.2 Volts) is coupled directly across the positive power supply terminal 264 and the negative power supply terminal 266 of the level detector circuit 250.

The output voltage ($V_{OUT}$) of the level detector circuit 250 is forced to either the level detector circuit's positive saturation level or negative saturation level based on whether the voltage at the non-inverting input terminal 262 is more or less positive than the reference voltage $V_{ref-2}$. If the output voltage $V_{OUT}$ is forced to the level detector circuit's positive saturation level, then the N-channel field-effect transistor (e.g., the field-effect transistor 112 shown in FIG. 1) is switched to its "on" state. In contrast, if the output voltage $V_{OUT}$ is forced to the level detector circuit's negative saturation level, then the N-channel field-effect transistor (e.g., the field-effect transistor 112 shown in FIG. 1) is switched to its "off" state. Notably, the gate drive circuit 290 advantageously provides a three-phase bridge rectifier circuit 100 with decreased N-channel MOSFET turn "on" and "off" times.

Figure 5A:
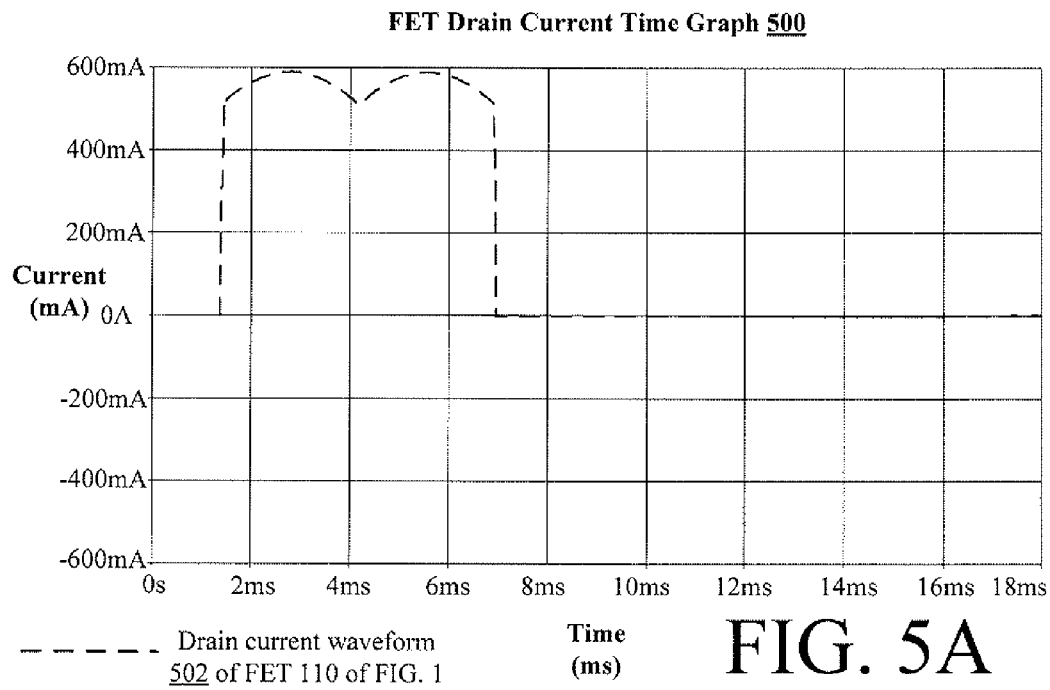
FIG. 5A is a time graph showing an exemplary drain current waveform for a first field effect transistor shown in FIG. 1.
Figure 5B:
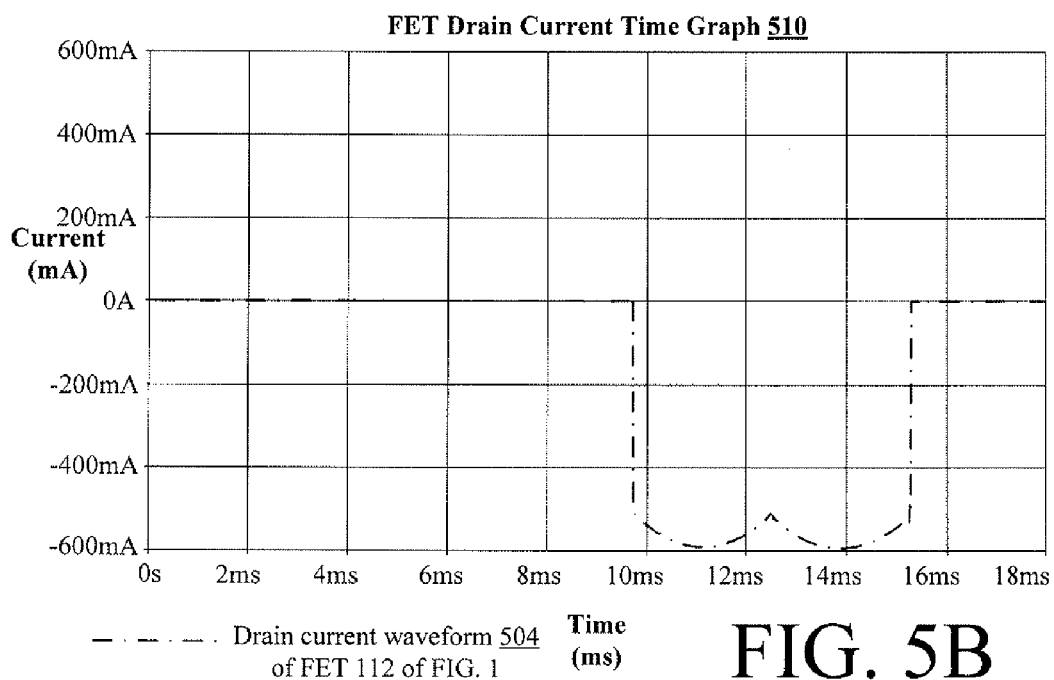
FIG. 5B is a time graph showing an exemplary drain current waveform for a second field effect transistor shown in FIG. 1.
Figure 5C:
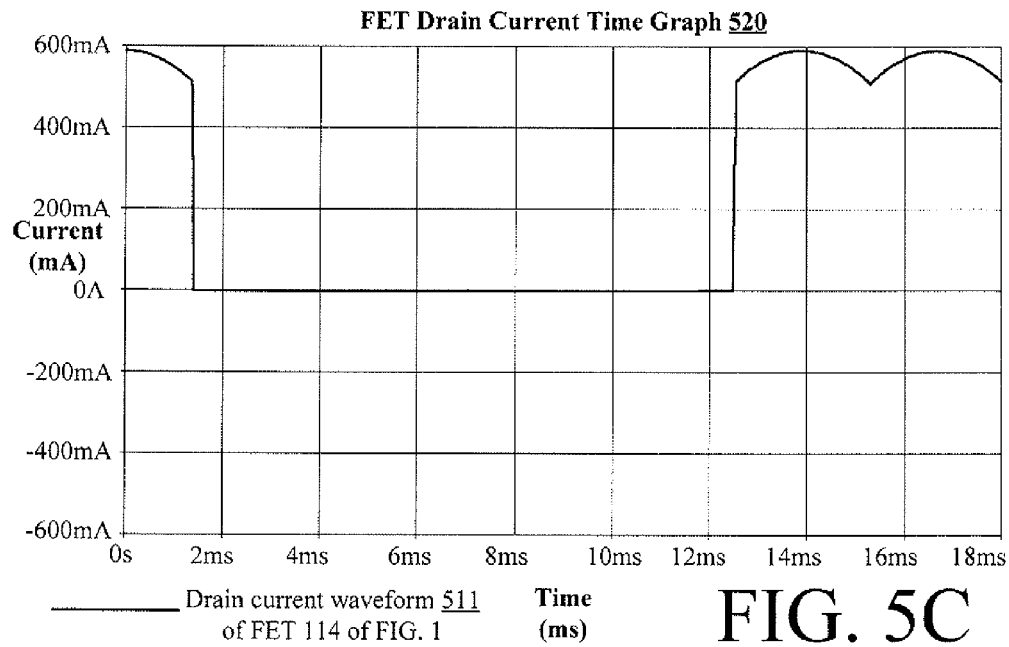
FIG. 5C is a time graph showing an exemplary drain current waveform for a third field effect transistor shown in FIG. 1.
Figure 5D:
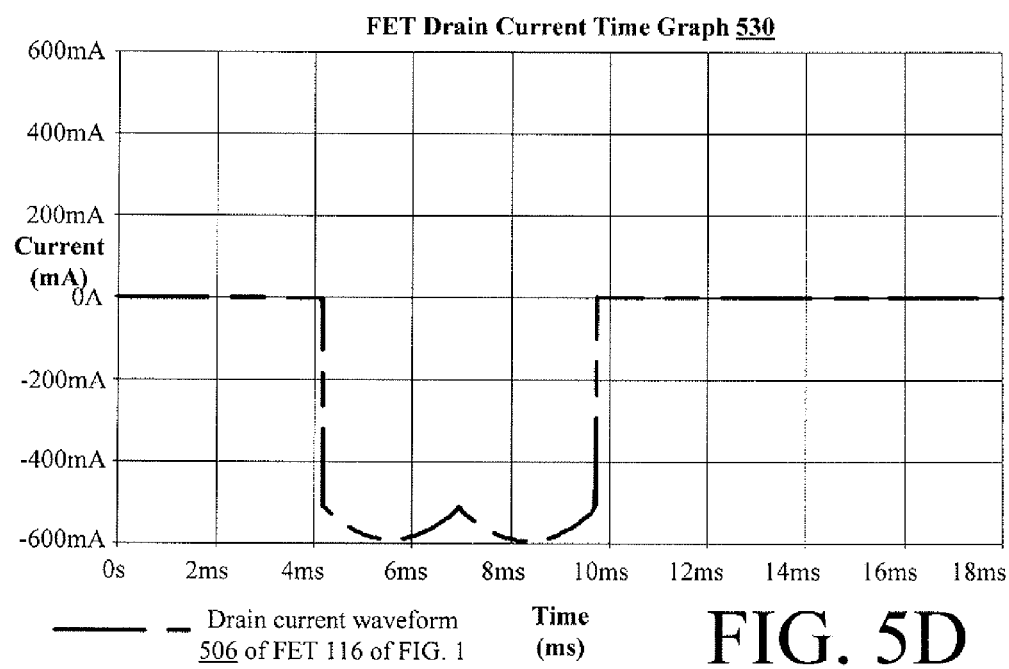
FIG. 5D is a time graph showing an exemplary drain current waveform for a fourth field effect transistor shown in FIG. 1.
Figure 5E:
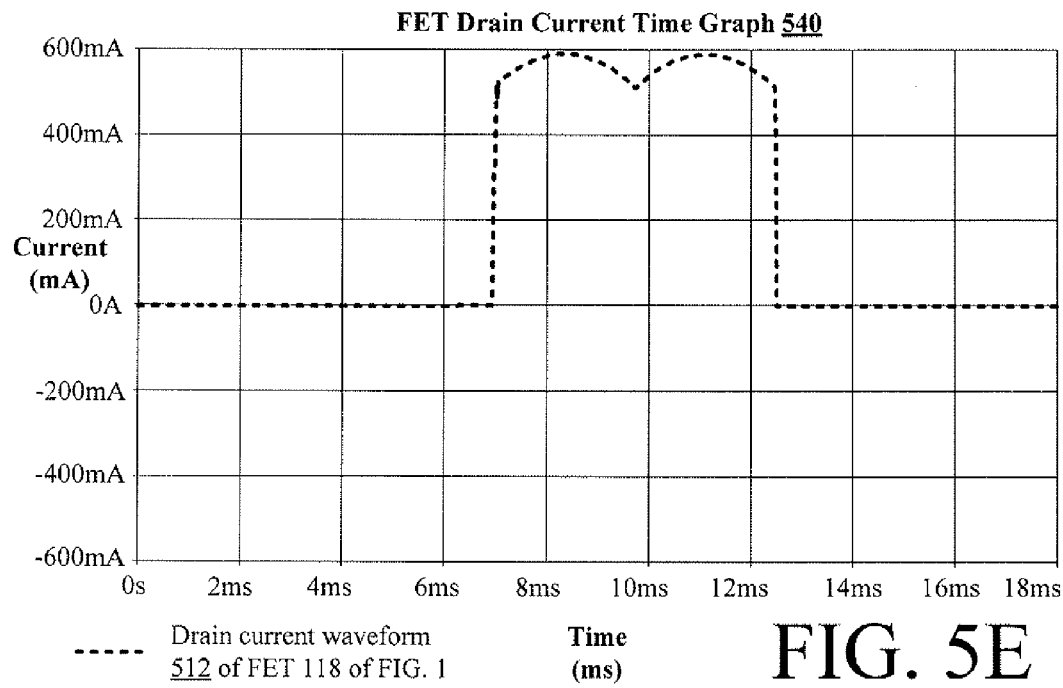
FIG. 5E is a time graph showing an exemplary drain current waveform for a fifth field effect transistor shown in FIG. 1.
Figure 5F:
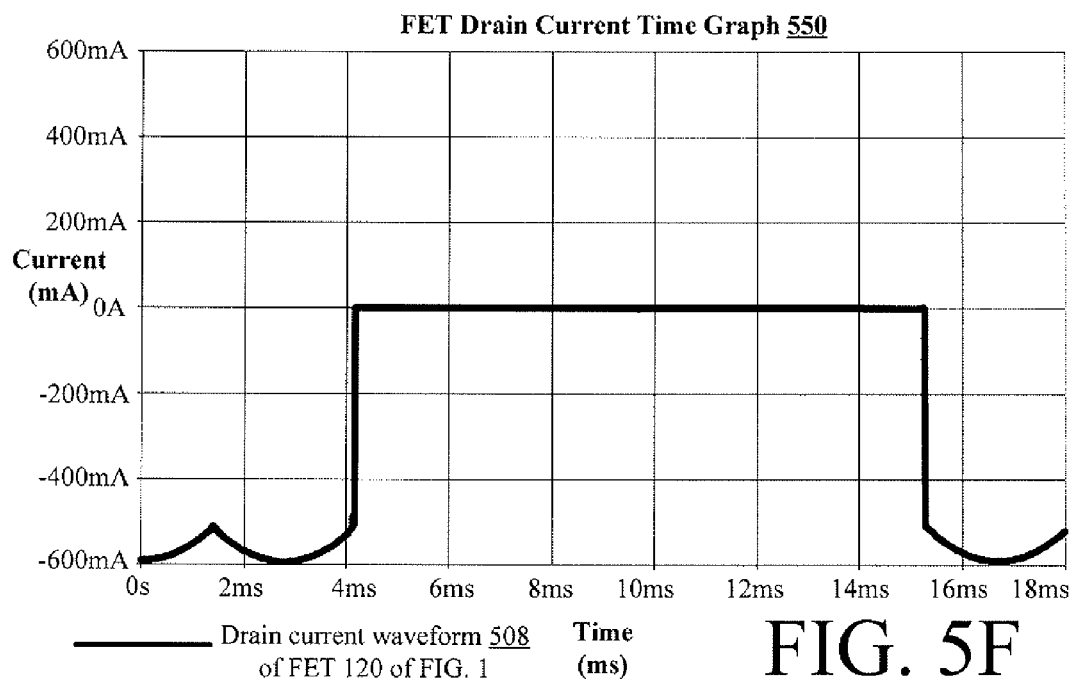
FIG. 5F is a time graph showing an exemplary drain current waveform for a sixth field effect transistor shown in FIG. 1.

The operation of the three-phase bridge rectifier circuit 100 will now be described in detail in relation to FIGS. 1-8. When AC voltage waveforms (e.g., AC voltage waveforms 402, 404 and 406 of FIGS. 4 and 7E) are applied to circuit 100 via input lines 151, 153 and 155, only one (1) P-channel MOSFET 110, 114, 118 will be switched to its "on" state at any given time. This MOSFET on/off switching scheme is illustrated by the FET drain current time graphs 500, 510, 520, 530, 540, 550 and 560 of FIGS. 5A-5G. Each of the FET drain current time graphs 500, 510, 520, 530, 540, 550 shows a respective drain current waveform 502, 504, 511, 506, 512, 508. It should be noted that FIG. 5G shows the drain current waveforms 502, 504, 511, 506, 512, 508 of FIGS. 5A-5F overlapping each other.

As shown in FIG. 5G, the first field effect transistor 110 is switched to its "on" state at a time $t_a$ and switched to its "off" state at a time $t_c$ as illustrated by the drain current waveform 502. At the time $t_c$, the fifth field effect transistor 118 is switched to its "on" state as illustrated by the drain current waveform 512. The fifth field effect transistor 118 is switched to its "off" state at a time $t_e$ as also illustrated by the drain current waveform 512. At the time $t_e$, the third field effect transistor 114 is switched to its "on" state as illustrated by the drain current waveform 511. The third field effect transistor 114 is turned "off" at a time $t_g$ as also illustrated by the drain current waveform 511. This "on/off" state switching process of the P-channel MOSFETs 110, 114, 118 is repeated until the AC voltage source(s) 102, 104, 106 cease(s) supplying AC voltage waveforms (e.g., AC voltage waveforms 402, 404 and 406 of FIG. 4) to the circuit 100.

Similarly, only one (1) N-channel MOSFET 112, 116, 120 will be switched to its "on" state at any given time. This N-channel MOSFET on/off switching scheme is also illustrated by the FET drain current graph 560 of FIG. 5G. As shown in FIG. 5G, the sixth field effect transistor 120 is switched to its "on" state at a particular time (not shown) and switched to its "off" state a time $t_b$ as illustrated by the drain current waveform 508. At time $t_b$, the fourth field effect transistor 116 is switched to its "on" state as illustrated by the drain current waveform 506. The fourth field effect transistor 116 is switched to its "off" state at time $t_d$ as also illustrated by the drain current waveform 506. At time $t_d$, the second field effect transistor 112 is switched to its "on" state as illustrated by the drain current waveform 504. The second field effect transistor 112 is switched to its "off" state at time $t_f$ as also illustrated by the drain current waveform 504. This "on/off" state switching process of the N-channel MOSFETs 112, 116, 120 is repeated until the AC voltage source(s) 102, 104, 106 cease(s) supplying AC voltage waveforms (e.g., AC voltage waveforms 402, 404 and 406 of FIG. 4) to the circuit 100.

As further shown by the FET drain current time graph 560 of FIG. 5G, the P-channel MOSFETs 110, 114, 118 of each series connected transistor pair 110/112, 114/116, 118/120 are switched to their "off" states before the N-channel MOSFETs 112, 116, 120 are switched to their "on" states, respectively. For example, the first field effect transistor 110 is switched to its "off" state and remains in its "off" state before the second field effect transistor 112 is switched to its "on" state, and vise versa. Similarly, the third field effect transistor 114 is switched to its "off" state and remains in its "off" state before the fourth field effect transistor 116 is switched to its "on" state, and vise versa. Likewise, the fifth field effect transistor 118 is switched to its "off" state and remains in its "off" state before the sixth field effect transistor 120 is switched to its "on" state, and vise versa. In effect, cross conduction of the series connected transistor pairs 110/112, 114/116, 118/120 does not occur during the "on/off" state transitions thereof.

Figure 7A:
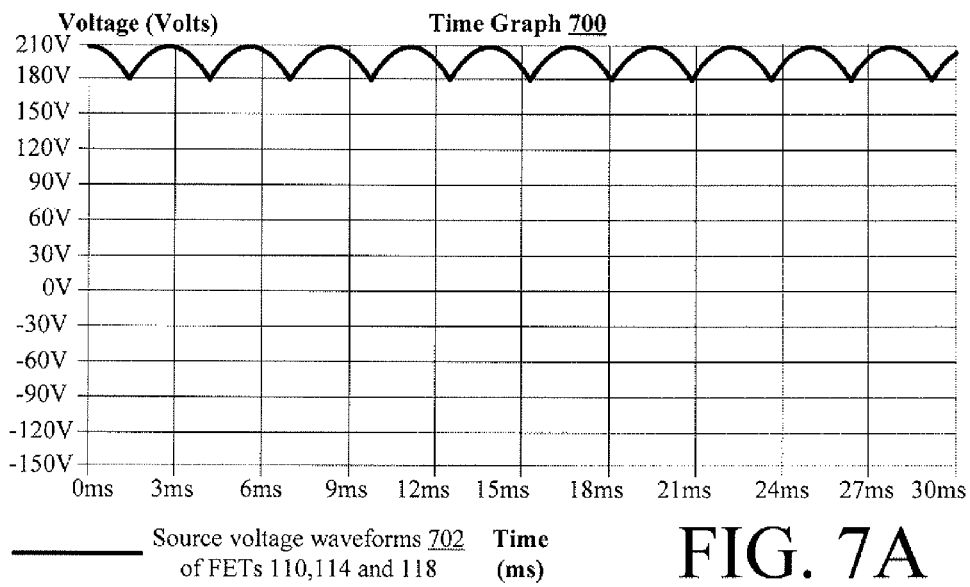
FIG. 7A is a time graph showing a source voltage waveform of field effect transistors shown in FIG. 1.
Figure 7B:
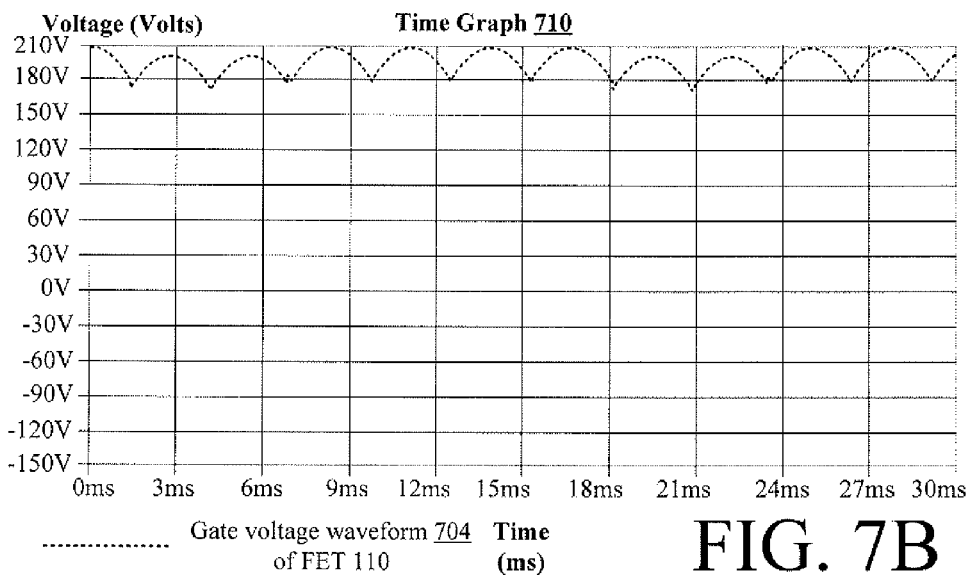
FIG. 7B is a time graph showing a gate voltage waveform of a field effect transistor shown in FIG. 1.
Figure 7C:
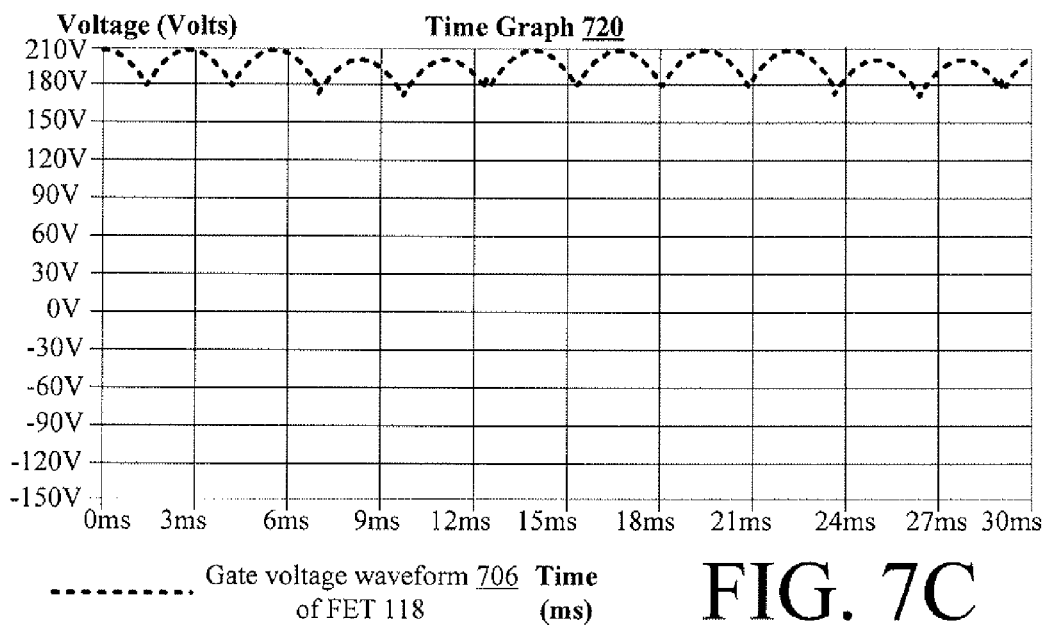
FIG. 7C is a time graph showing a gate voltage waveform of a field effect transistor shown in FIG. 1.
Figure 7D:
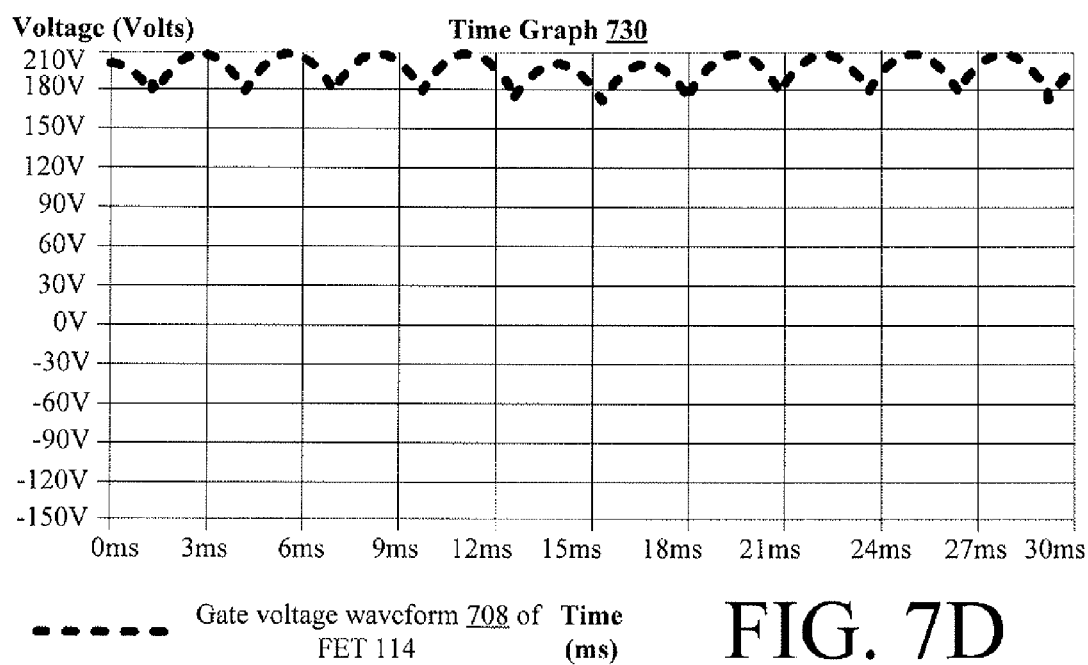
FIG. 7D is a time graph showing a gate voltage waveform of a field effect transistor shown in FIG. 1.

Notably, the FET "on/off" state transition process described above is at least partially defined by the polarity of the AC voltage waveforms (e.g., AC voltage waveforms 402, 404 and 406 of FIGS. 4 and 7E) and the intersection of the AC voltage waveforms as shown by the time graph 740 of FIG. 7E. It should be noted that FIG. 7E shows the voltage waveforms 702, 704, 706, 708 of FIGS. 7A-7D overlapping each other. FIG. 7E also shows the AC voltage waveforms 402, 404 and 406 of FIG. 4 overlapping each other.

As shown in FIG. 7E, if the AC input voltage waveform 402 has a positive polarity, then the first field effect transistor 110 is switched to its "on" state at time $t_a$. Time $t_a$ represents when a rising edge of a positive polarity portion of the AC input voltage waveform 402 and a falling edge of a positive polarity portion of the AC input voltage waveform 404 intersect. Similarly, if the AC input voltage waveform 406 has a positive polarity, then the fifth field effect transistor 118 is switched to its "on" state at time $t_c$. Time $t_c$ represents when a rising edge of a positive polarity portion of the AC input voltage waveform 406 and a falling edge of a positive polarity portion of the AC input voltage waveform 402 intersect. Likewise, if the AC input voltage waveform 404 has a positive polarity, then the third field effect transistor 114 is switched to its "on" state at time $t_e$. Time $t_e$ represents when a rising edge of a positive polarity portion of the AC input voltage waveform 404 and a falling edge of a positive polarity portion of the AC input voltage waveform 406 intersect. As should be understood, each field effect transistor 110, 114, 118 is switched to its "on" state when a gate-to-source voltage $V_{gs}$ is less than a threshold gate-to-source voltage $V_{gs\_th}$.

Figure 8A:
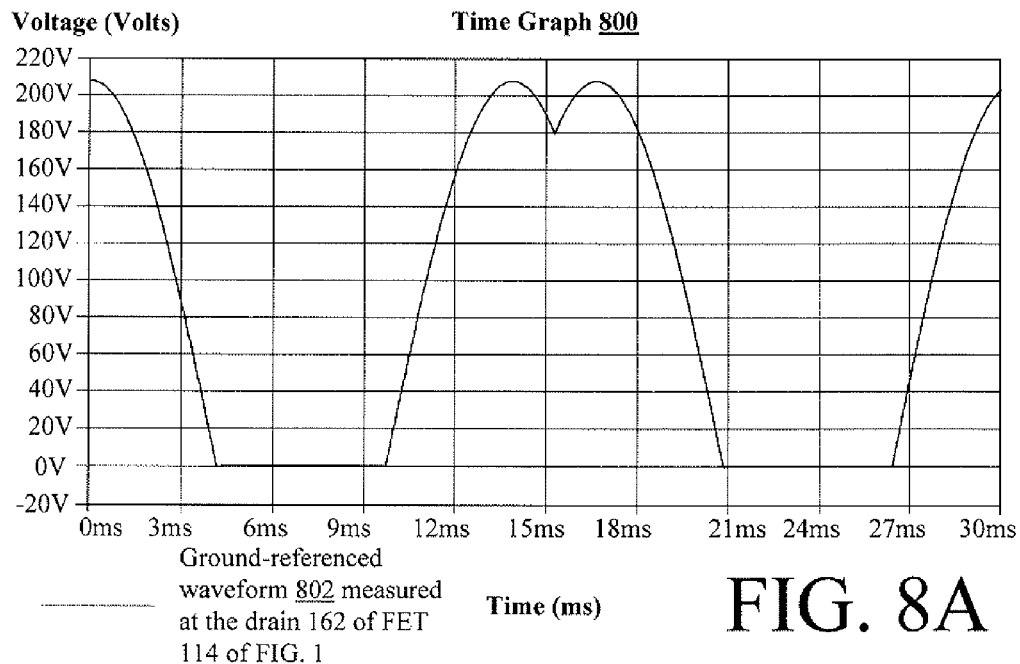
FIG. 8A is a time graph showing a first ground-referenced waveform measured at a drain of a field effect transistor shown in FIG. 1.
Figure 8B:
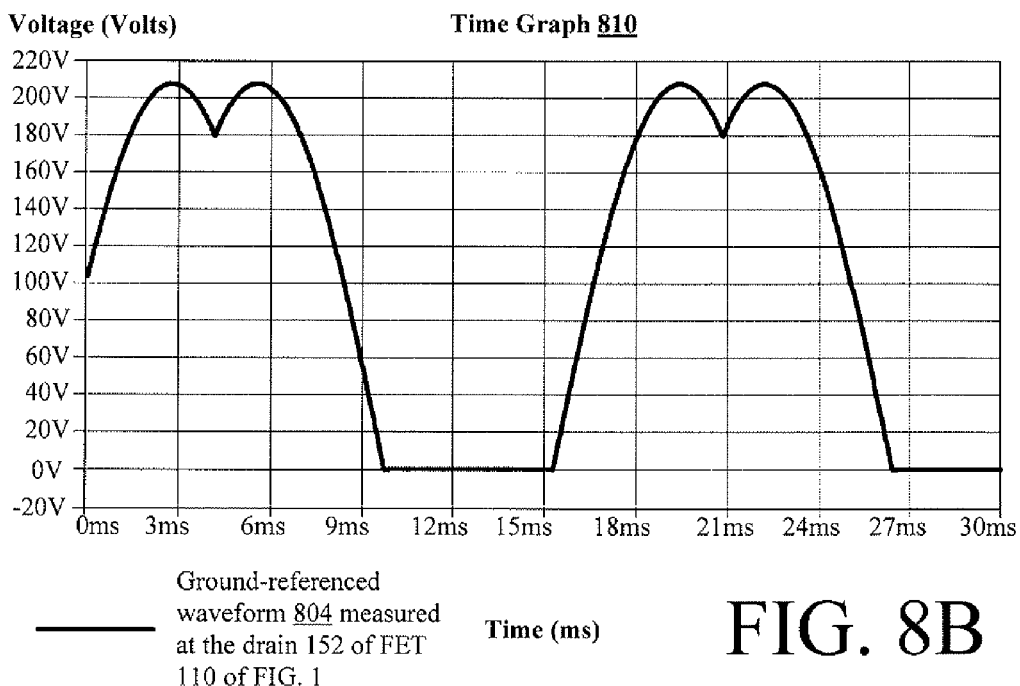
FIG. 8B is a time graph showing a first ground-referenced waveform measured at a drain of a field effect transistor shown in FIG. 1.
Figure 8C:
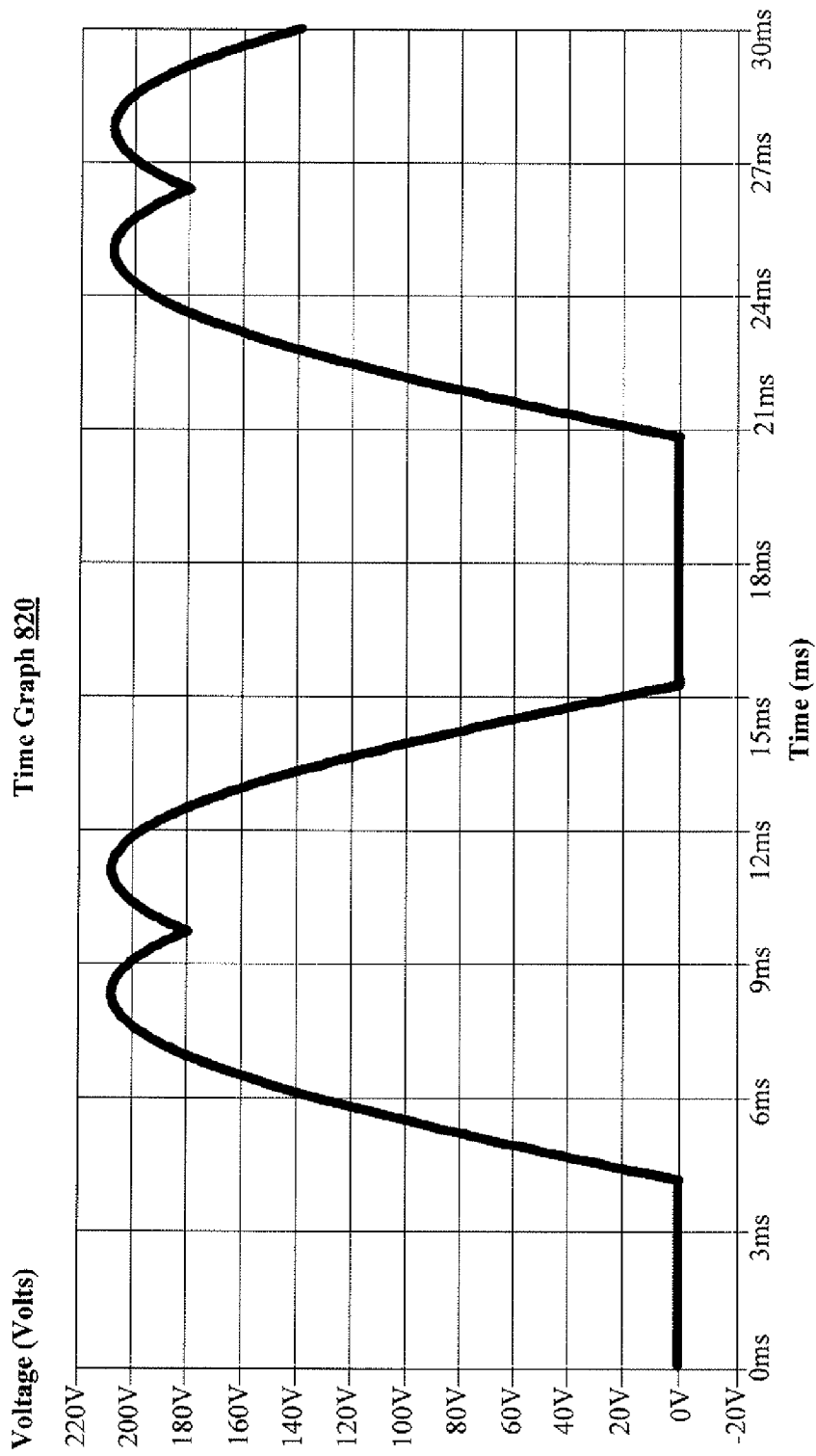
FIG. 8C is a time graph showing a first ground-referenced waveform measured at a drain of a field effect transistor shown in FIG. 1.
Figure 8D:
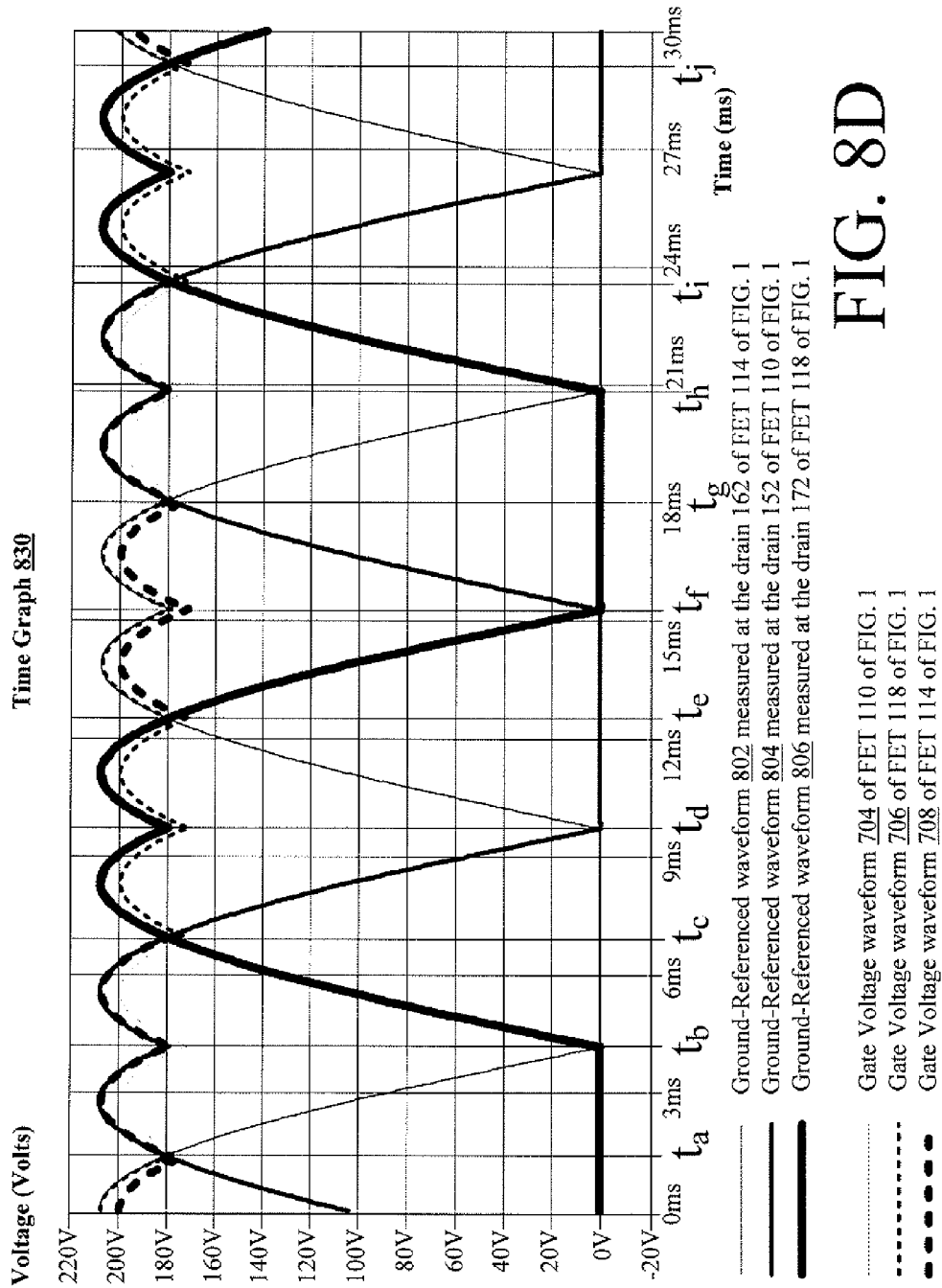
FIG. 8D is a time graph showing that a FET "on/off" state transition process is achieved with the use of the three (3) ground-referenced waveforms shown in FIGS. 8A-8C.

The FET "on/off" state transition process described above is achieved with the use of three (3) ground-referenced waveforms 802, 804, 806 shown in the time graphs 800, 810, 820 of FIGS. 8A-8C, the voltage divider circuits 192/188, 130/140, 107/196, 150/160, 115/111, 170/180 (shown in FIG. 1) and the diodes 190, 128, 198, 148, 113, 168 (shown in FIG. 1). Each of the time graphs 800, 810, 820 shows a respective ground-referenced waveform 802, 804, 806. It should be noted that FIG. 8D shows the ground-referenced waveform 802, 804, 806 of FIGS. 8A-8C overlapping each other. FIG. 8D also shows the gate voltage waveforms 704, 706, 708 of FIGS. 7B-7D overlapping each other.

As shown in FIG. 8D, the first ground-referenced waveform 802 is an input voltage waveform supplied to the circuit 100 and measured at the drain 162 of the third field effect transistor 114. The second ground-referenced waveform 804 is an input voltage waveform supplied to the circuit 100 and measured at the drain 152 of the first field effect transistor 110. The third ground-referenced waveform 806 is an input voltage waveform supplied to the circuit 100 and measured at the drain 172 of the fifth field effect transistor 118. As noted above, the first field effect transistor 110 is switched to its "on" state at time $t_a$ and switched to its "off" state at time $t_c$. The fifth field effect transistor 118 is switched to its "on" state at time $t_c$ and switched to its "off" state at time $t_e$. The third field effect transistor 114 is switched to its "on" state at time $t_e$ and switched to its "off" state at time $t_g$.

As shown in FIG. 8D, time $t_a$ represents the time when a falling edge of the first ground-referenced waveform 802 intersects a rising edge of the second ground-referenced waveform 804. Notably, the voltage divider circuit 192/188 and diode 190 of FIG. 1 collectively provide a means for indicating to the gate drive circuit 101a when to switch the first field effect transistor 110 to its "on" state and/or "off" state. In this regard, it should be understood that the first field effect transistor 110 does not conduct during time $t_c$-$t_e$, i.e., when the ground-referenced waveform 806 has voltage values greater than those of the ground-referenced waveforms 802 and 804. It should also be understood that the diode 190 of FIG. 1 is connected electrically between the drain 162 of the third field effect transistor 114 and the terminal 3 of the gate drive circuit 101a for the first field effect transistor 110. The diode 190 is provided to ensure that the first field effect transistor 110 does not conduct during the period of time $t_e$-$t_g$. During the period of time $t_e$-$t_g$, current is allowed to flow from the AC voltage source 104 through the diode 190 to the terminal 3 of the gate drive circuit 101a. In effect, the voltage at the terminal 3 of the gate drive circuit 101a is more positive than the reference voltage $V_{ref-1}$. When this occurs, the gate drive circuit 101a supplies a voltage waveform having an "off" state value to the gate 154 of the first field effect transistor 110. As a result, the voltage at the gate 154 of the first field effect transistor 110 is non-negative relative to its source voltage. In this regard, it should be noted that the voltage at the gate 154 of the first field effect transistor 110 may be slightly negative since the positive saturation voltage at the gate driver is not exactly V+ shown in FIG. 1. The key is that the voltage at the gate 154 of the first field effect transistor 110 is not below a gate-to-source threshold voltage $V_{gs\_th}$ of the first field effect transistor 110. Consequently, the first field effect transistor 110 remains in its "off" state outside the region of interest $t_a$-$t_c$. In its "off" state, the field effect transistor 110 does not conduct, i.e., a drain-to-source current $I_{ds}$ is approximately zero (0).

The first field effect transistor 110 is switched to its "on" state when the falling edge of the first ground-referenced waveform 802 intersects the rising edge of the second ground-referenced waveform 804. The first field effect transistor 110 remains in its "on" state during the region of interest $t_a$-$t_c$, i.e., until the voltage values of the third ground-referenced waveform 806 are greater then the voltage values of the second ground reference waveform 804. During its "on" state, the voltage at the gate 154 of the first field effect transistor 110 is negative relative to its source voltage. Also during its "on" state, the drain-to-source current $I_{ds}$ flows via a conducting channel that connects the drain 152 to the source 156 of the first field effect transistor 110. The conductivity of the first field effect transistor 110 is varied by the electric field that is produced when a voltage is applied between the gate 154 and source 156 thereof. Hence, the current flowing between the drain 152 and source 156 is controlled by the voltage applied between the gate 154 and source 156.

As also shown in FIG. 8D, time $t_c$ represents the time when a falling edge of the second ground-referenced waveform 804 intersects the rising edge of the third ground-referenced waveform 806. Notably, the voltage divider 115/111 and the diode 113 of FIG. 1 collectively provide a means for indicating to the gate drive circuit 101c when to switch the fifth field effect transistor 118 to its "on" state and/or "off" state. In this regard, it should be understood that the fifth field effect transistor 118 does not conduct during time $t_e$-$t_g$, i.e., when the ground-referenced waveform 802 has voltage values greater than those of the ground-referenced waveforms 804 and 806. It should also be understood that the diode 113 is connected electrically between the drain of the first field effect transistor 110 and the terminal 3 of the gate drive circuit 101c. The diode 113 is provided to ensure that the fifth field effect transistor 118 does not conduct during the period of time $t_g$-$t_i$. During the period of time $t_g$-$t_i$, current is allowed to flow from the AC voltage source 102 through the diode 113 to the terminal 3 of the gate drive circuit 101c. In effect, the voltage at the terminal 3 of the gate drive circuit 101c is more positive than the reference voltage $V_{ref-1}$. When this occurs, the gate drive circuit 101a supplies a voltage waveform to the gate 174 of the fifth field effect transistor 118. As a result, the voltage at the gate 174 of the fifth field effect transistor is non-negative relative to its source voltage. Consequently, the fifth field effect transistor 118 remains in its "off" state outside the region of interest $t_c$-$t_e$. In its "off" state, the fifth field effect transistor 118 does not conduct, i.e., a drain-to-source current $I_{ds}$ is approximately zero (0).

The fifth field effect transistor 118 is switched to its "on" state when the falling edge of the second ground-referenced waveform 804 intersects the rising edge of the third ground-referenced waveform 806. The fifth field effect transistor 118 remains in its "on" state during the region of interest $t_c$-$t_e$, i.e., until the voltage values of the first ground-referenced waveform 802 are greater that the voltage values of the third ground-referenced waveform 806. During its "on" state, the voltage at the gate 174 of the fifth field effect transistor 118 is negative relative to its source voltage. Also during its "on" state, the drain-to-source current $I_{ds}$ flows via a conducting channel that connects the drain 172 to the source 176 of the fifth field effect transistor 118. The conductivity of the fifth field effect transistor 118 is varied by the electric field that is produced when a voltage is applied between the gate 174 and source 176 thereof. Hence, the current flowing between the drain 172 and source 176 is controlled by the voltage applied between the gate 174 and source 176.

As further shown in FIG. 8D, time $t_e$ represents the time when the falling edge of the third ground-referenced waveform 806 intersects the rising edge of the first ground-referenced waveform 802. Time $t_g$ represents the time when the falling edge of the first ground-referenced waveform 802 intersects the rising edge of the second ground-referenced waveform 804. Notably, the voltage divider 107/196 and diode 198 of FIG. 1 collectively provide a means for indicating to the gate drive circuit 101b when to switch the third field effect transistor 114 to its "on" state and/or "off" state. In this regard, it should be understood that the third field effect transistor 114 does not conduct during the period of time $t_g$-$t_i$, i.e., when the ground-referenced waveform 804 has voltage values greater than those of ground-referenced waveforms 802 and 806. It should also be understood that the diode 198 is connected electrically between the drain 172 of the fifth field effect transistor 118 and the terminal 3 of the gate drive circuit 101b. The diode 198 is provided to ensure that the third field effect transistor 114 does not conduct during period of time $t_c$-$t_e$. During the period of time $t_c$-$t_e$, current is allowed to flow from the AC voltage source 106 through the diode 198 to the terminal 3 of the gate drive circuit 101b. In effect, the voltage at the terminal 3 of the gate drive circuit 101b is more positive than the reference voltage $V_{ref-1}$. When this occurs, the gate drive circuit 101b supplies a voltage waveform to the gate 164 of the third field effect transistor 114. As a result, the voltage at the gate 164 of the third field effect transistor 114 is non-negative relative to its source voltage. Consequently, the third field effect transistor 114 remains in its "off" state outside the region of interest $t_e$-$t_g$. In its "off" state, the third field effect transistor 114 does not conduct, i.e., a drain-to-source current $I_{ds}$ is approximately zero (0).

The third field effect transistor 114 is switched to its "on" state when the falling edge of the third ground-referenced waveform 806 intersects the rising edge of the first ground-referenced waveform 802. The third field effect transistor 114 remains in its "on" state during the region of interest $t_e$-$t_g$, i.e., until the voltage values of the second ground-referenced waveform 804 exceed the voltage values of the first ground-referenced waveform 802. During its "on" state, the voltage at the gate 164 of the third field effect transistor 114 is negative relative to its source voltage. Also during its "on" state, the drain-to-source current $I_{ds}$ flows via a conducting channel that connects the drain 162 to the source 166 of the third field effect transistor 114. The conductivity of the third field effect transistor 114 is varied by the electric field that is produced when a voltage is applied between the gate 164 and source 166 thereof. Hence, the current flowing between the drain 162 and source 166 is controlled by the voltage applied between the gate 164 and source 166.

It should be understood that the N-channel field effect transistors 112, 116, 120 are switched to their "on" states when a gate-to-source voltage $V_{gs}$ is greater than a threshold gate-to-source voltage $V_{gs\_th}$. With reference to FIGS. 5G and 8D, it should be understood that the fourth field effect transistor 116 is switched to its "on" state when the falling edge of the first ground-referenced waveform 802 intersects the rising edge of the third ground-referenced waveform 806. The fourth field effect transistor 116 remains in its "on" state during the region of interest $t_b$-$t_d$, i.e., until the voltage values of the first ground-referenced waveform 802 exceed the voltage values of the second ground-referenced waveform 804. Likewise, the second field effect transistor 112 is switched to its "on" state when the falling edge of the second ground-referenced waveform 804 intersects the rising edge of the first ground-referenced waveform 802. The second field effect transistor 112 remains in its "on" state during the region of interest $t_d$-$t_f$, i.e., until the voltage values of the second ground-referenced waveform 804 exceed the voltage values of the third ground-referenced waveform 806. Similarly, the sixth field effect transistor 120 is switched to its "on" state when the falling edge of the third ground-referenced waveform 806 intersects the rising edge of the second ground-referenced waveform 804. The sixth field effect transistor 120 remains in its "on" state during the region of interest $t_f$-$t_h$, i.e., until the voltage values of the third ground-referenced waveform 806 exceed the voltage values of the first ground-referenced waveform 802.

When a field effect transistor 110, 112, 114, 116, 118, 120 is switched to its "on" state, a relatively low resistance path is created between a drain 152, 122, 162, 132, 172, 142 and source 156, 126, 166, 136, 176, 146 thereof. The exact amount of this resistance will depend upon several factors, including the specified drain-source "on" state resistance of the field effect transistors 110, 112, 114, 116, 118, 120. For example, "on" state resistance values of between half a milli Ohm (0.5 mΩ) and ten Ohms (10Ω) are typical for such devices. Generally, P-channel devices have a slightly higher resistance as compared to N-channel devices. Once turned on, however, current will continue to flow between the drain 152, 122, 162, 132, 172, 142 and source 156, 126, 166, 136, 176, 146 of the field effect transistor 110, 112, 114, 116, 118, 120 through the low resistance path, thereby eliminating a voltage drop associated with a body diode 306, 308 thereof. Consequently, if the load 109 is connected across output lines 159, 157, then the voltage drop caused by the field effect transistors 110, 112, 114, 116, 118, 120 of circuit 100 can be considerably less than the typical diode drop associated with a conventional three-phase diode bridge rectifier circuit (such as circuit 1000 shown in FIG. 10).

If an AC input voltage applied on an input line 151, 153, 155 is sufficiently high, it will exceed a reverse breakdown voltage of an optional zener diode 121, 131, 123, 133, 125, 135 associated with the field effect transistor 110, 112, 114, 116, 118, 120. This will cause the optional zener diode 121, 131, 123, 133, 125, 135 to clamp the voltage between terminals 2 and 3 of the gate drive circuits.

Figure 9A:
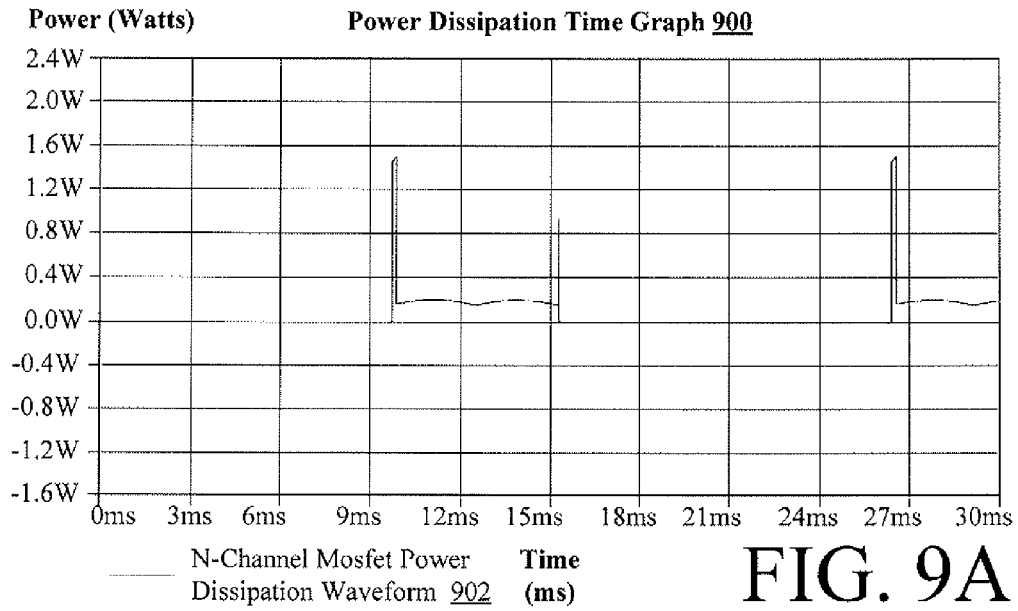
FIG. 9A is a time graph showing a power dissipation waveform for an N-channel MOSFET of FIG. 1.
Figure 9B:
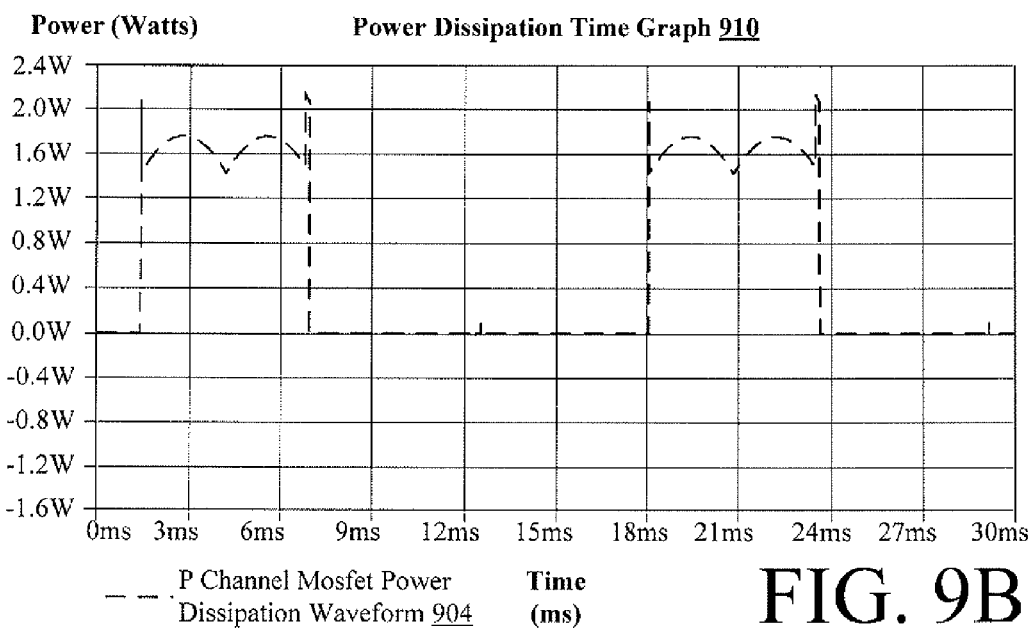
FIG. 9B is a time graph showing a power dissipation waveform for a P-channel MOSFET of FIG. 1.
Figure 9C:
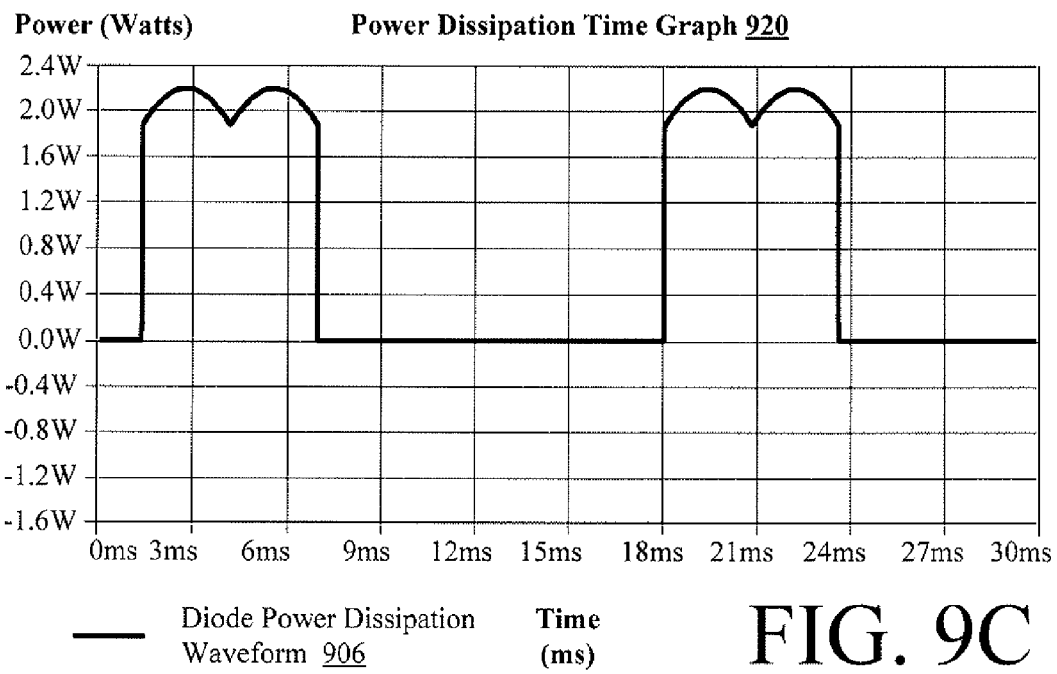
FIG. 9C is a time graph showing that a power dissipation waveform for a diode of a conventional three-phase bridge rectifier circuit.
Figure 9D:
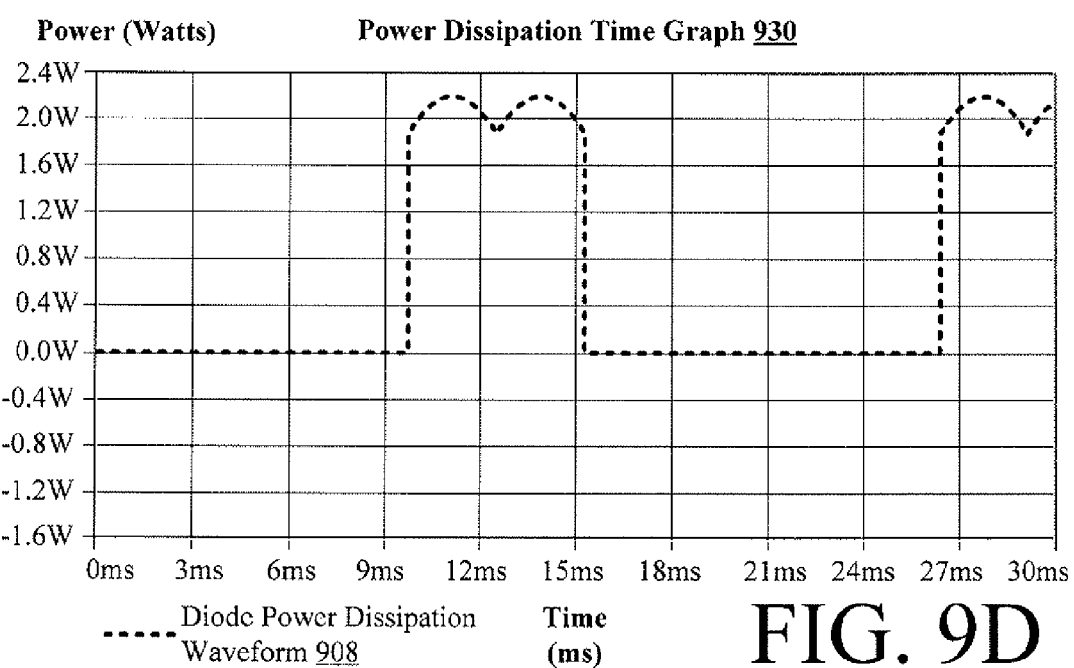
FIG. 9D is a time graph showing that a power dissipation waveform for a diode of a conventional three-phase bridge rectifier circuit.
Figure 10:
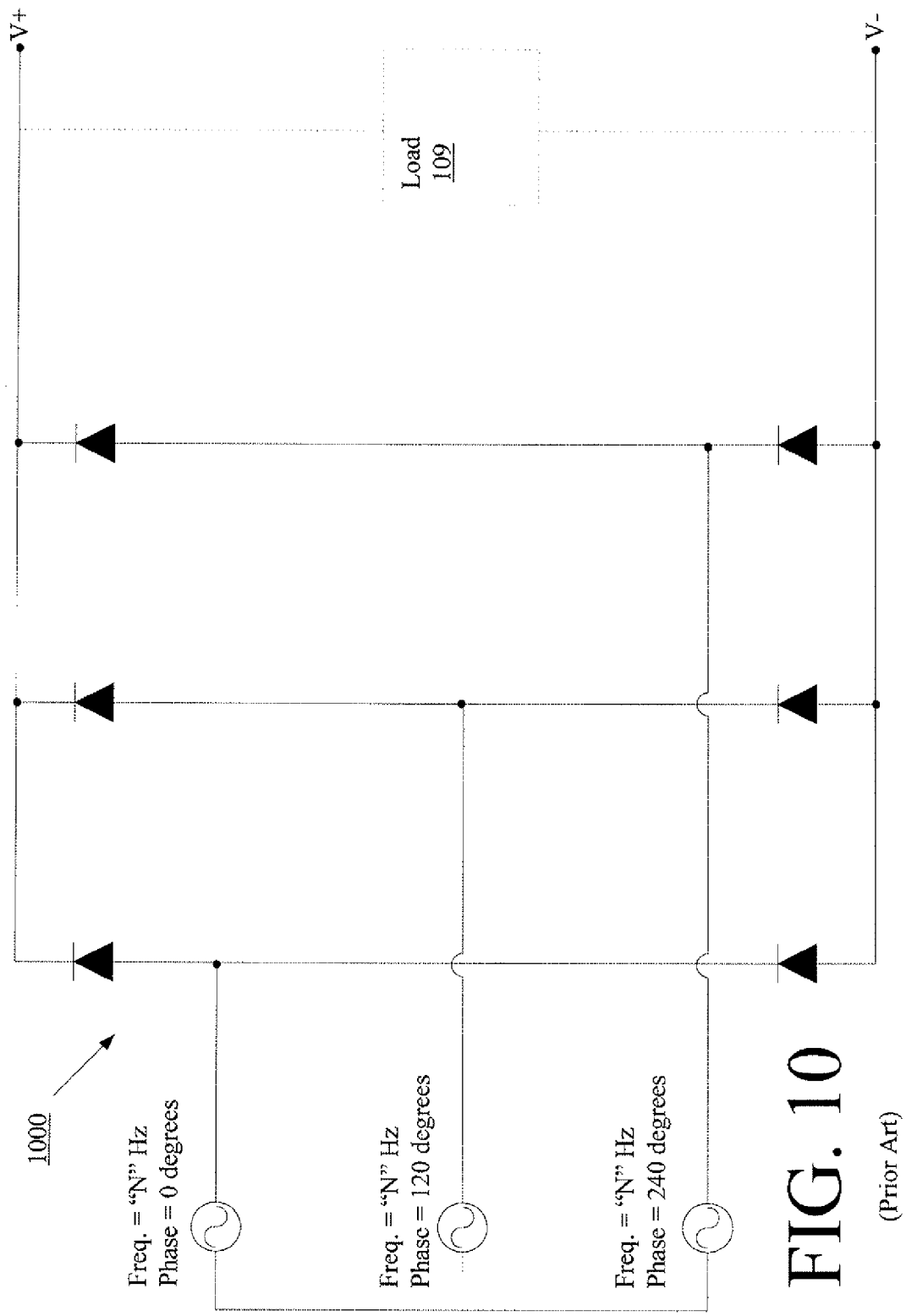
FIG. 10 is a schematic illustration of a conventional three-phase diode bridge rectifier circuit.

Referring now to FIGS. 9A-9E, there are provided power dissipation time graphs 900, 910, 920, 930, 940 that are useful for understanding certain advantages of the present invention. Each of the time graphs 900, 910, 920, 930 shows a respective power dissipation waveform 902, 904, 906, 908. It should be noted that FIG. 9E shows the waveforms 902, 904, 906, 908 of FIGS. 9A-9D overlapping each other. As shown in FIGS. 9A-9E, the first power dissipation waveform 902 represents power dissipated in an N-channel MOSFET of the circuit 100 with a load 109 connected thereto. The second power dissipation waveform 904 represents power dissipated in a P-channel MOSFET of the circuit 100 with the load 109 connected thereto. Each of the third and fourth power dissipation waveforms 906, 908 represents power dissipated in a diode of a conventional three-phase bridge rectifier circuit 1000 with the load 109 connected thereto as shown in FIG. 10.

As evidenced by the power dissipation time graph 940 of FIG. 9E, the amount of power dissipated in the field effect transistors of circuit 100 is substantially less than the power dissipated in the diodes of the conventional three-phase bridge rectifier circuit 1000. For example, the power dissipated in the field effect transistors of circuit 100 can be reduced by seventy-five percent or more (>75%) as compared to the power dissipated in the diodes of the conventional three-phase bridge rectifier circuit 1000. Notably, circuit 100 can be modified so as to decrease the amount of power dissipated in the field effect transistors than that shown in FIG. 9E. For example, the power dissipated in circuit 100 can be further reduced if one or more field effect transistors are connected in parallel with the field effect transistors 110, 112, 114, 116, 118, 120. The power dissipated in circuit 100 can also be further reduced if field effect transistors with relatively low drain-to-source "on" state resistances $R_{DSon}$ are employed.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

I claim:

1. A three-phase bridge rectifier circuit connectable to at least one AC voltage source via a plurality of input lines and to a load via a pair of output lines, said at least one AC voltage source configured to supply said three-phase bridge rectifier circuit with a plurality of AC voltage waveforms that differ in phase by a certain amount, said three-phase bridge rectifier circuit comprising:

first and second field effect transistors of different channel types, a source-drain path of said first field effect transistor connected in series with a source-drain path of said second field effect transistor to form a first series transistor combination connected across said pair of output lines;

third and fourth field effect transistors of different channel types, a source-drain path of said third field effect transistor connected in series with a source-drain path of said fourth field effect transistor to form a second series transistor combination connected across said pair of output lines;

fifth and sixth field effect transistors of different channel types, a source-drain path of said fifth field effect transistor connected in series with a source-drain path of said sixth field effect transistor to form a third series transistor combination connected across said pair of output lines;

a plurality of gate drive circuits configured to sense voltages applied on said plurality of input lines and supply a voltage to gates of said field effect transistors for switching said field effect transistors to their "on" states at certain times determined based on said sensed voltages, each having a first terminal connected to a gate of said respective one of said field effect transistors, a second terminal coupled to a source of a respective one of said field effect transistors, and a third terminal connected to a respective voltage tap provided by a voltage divider circuit; and a plurality of diodes, each connected directly between a drain of a first transistor of said field effect transistors and said third terminal of a respective one of said plurality of gate drive circuits that is provided for a second transistor of said field effect transistors that is different than said first transistor.

2. The three-phase bridge rectifier circuit according to claim 1, further comprising a plurality of voltage divider circuits, each provided for said respective one of said field effect transistors, each of said plurality of voltage divider circuits includes a first resistor and a second resistor connected in series from said source of said respective one of said field effect transistors to one of said plurality of input lines.

3. The three-phase bridge rectifier circuit according to claim 2, wherein each said third terminal of said plurality of gate drive circuits is connected to an interconnection point between said first and said second resistors of a respective one of said plurality of voltage divider circuits.

4. The three-phase bridge rectifier circuit according to claim 1, further comprising a plurality of voltage clamping devices, each connected between said third terminal of a respective one of said gate drive circuits and a respective one of said pair of output lines.

5. The three-phase bridge rectifier circuit according to claim 1, wherein a first input line of said plurality of input lines is connected to drains of said first and second field effect transistors, a second input line of said plurality of input lines is connected to drains of said third and fourth field effect transistors, and a third input line of said plurality of input lines is connected to drains of said fifth and sixth field effect transistors.

6. The three-phase bridge rectifier circuit according to claim 1, wherein said first, third and fifth field effect transistors are of a first channel type and said second, fourth and sixth field effect transistors are of a second channel type different from said first channel type.

7. The three-phase bridge rectifier circuit according to claim 1, wherein each of said field effect transistors is a MOSFET type device.

8. The three-phase bridge rectifier circuit according to claim 1, wherein each of said field effect transistors is an enhancement mode field effect transistor.

9. The three-phase bridge rectifier circuit according to claim 1, wherein each of said plurality of gate drive circuits includes a level detector circuit configured for providing a gate control output signal for each said field effect transistor to selectively switch said field effect transistor between an "on" state and an "off" state.

10. The three-phase bridge rectifier circuit according to claim 9, wherein said level detector circuit is a comparator.

11. The three-phase bridge rectifier circuit according to claim 9, wherein each of said plurality of gate drive circuits further includes a resistor connected between an output terminal of said level detector circuit and a positive power supply terminal of said level detector circuit.

12. The three-phase bridge rectifier circuit according to claim 9, wherein each of said plurality of gate drive circuits is configured for being excited by said level detector circuit and for driving said field effect transistor by supplying a voltage having an "on state" voltage value to said gate of said field effect transistor.

13. The three-phase bridge rectifier circuit according to claim 1, wherein each of said field effect transistors is switched to its "on" state when a rising edge of a first ground-referenced waveform intersects a falling edge of a second ground-referenced waveform, wherein each of said first and second ground-reference waveforms represents an input voltage waveform supplied to said three-phase bridge rectifier circuit.

14. A three-phase bridge rectifier circuit connectable to at least one AC voltage source via a plurality of input lines and to a load via a pair of output lines, said at least one AC voltage source configured to supply said three-phase bridge rectifier circuit with a plurality of AC voltage waveforms that differ in phase by a certain amount, said three-phase bridge rectifier circuit comprising:

first and second field effect transistors of different channel types, a source-drain path of said first field effect transistor connected in series with a source-drain path of said second field effect transistor to form a first series transistor combination connected across said pair of output lines;

third and fourth field effect transistors of different channel types, a source-drain path of said third field effect transistor connected in series with a source-drain path of said fourth field effect transistor to form a second series transistor combination connected across said pair of output lines;

fifth and sixth field effect transistors of different channel types, a source-drain path of said fifth field effect transistor connected in series with a source-drain path of said sixth field effect transistor to form a third series transistor combination connected across said pair of output lines;

a plurality of comparator circuits, each coupled to a source of a respective field effect transistor of said field effect transistors and a gate of said respective field effect transistor, said plurality of comparator circuits configured to sense voltages applied on said plurality of input lines and supply voltages to said gates for switching said field effect transistors to their "on" states at certain times determined based on said sensed voltages; and a plurality of diodes, each connected directly between a drain of a first transistor of said field effect transistors and a respective one of said plurality of comparator circuits that is provided for a second transistor of said field effect transistors that is different than said first transistor.

15. A three-phase rectifier circuit connectable to at least one AC voltage source via a plurality of input lines and to a load via a pair of output lines, said at least one AC voltage source configured to supply said three-phase bridge rectifier circuit with a plurality of AC voltage waveforms that differ in phase by a certain amount, said three-phase bridge rectifier circuit comprising:

a three-phase bridge rectifier circuit comprised of a plurality of field effect transistors;

a plurality of voltage divider circuits, each provided for a respective field effect transistor of said field effect transistors, each of said plurality of voltage divider circuits includes a first resistor and a second resistor connected in series from a source of said respective field effect transistor to a respective one of said plurality of input lines;

a plurality of gate drive circuits configured to sense voltages applied on said plurality of input lines and supply a voltage to said field effect transistors for switching said field effect transistors to their "on" states at certain times determined based on said sensed voltages, each of said plurality of gate drive circuits coupled to a respective voltage divider circuit of said plurality of voltage divider circuits and a gate of said respective field effect transistor; and a plurality of diodes, each connected directly between a drain of a first transistor of said field effect transistors and a respective one of said plurality of gate drive circuits that is provided for a second transistor of said field effect transistors that is different than said first transistor.

16. The three-phase rectifier circuit according to claim 15, further comprising a plurality of diodes, each connected between a drain of said respective field effect transistor and a terminal of a respective one of said plurality of gate drive circuits.

17. The three-phase rectifier circuit according to claim 15, further comprising a plurality of voltage clamping devices, each connected between a terminal of a respective one of said gate drive circuits and a respective one of said pair of output lines.

* * * * *